United States Patent
Zinck et al.

(10) Patent No.: US 12,407,018 B2
(45) Date of Patent: *Sep. 2, 2025

(54) RECHARGEABLE BATTERY CELL

(71) Applicant: Innolith Technology AG, Basel (CH)

(72) Inventors: Laurent Zinck, Mothern (FR); Christian Pszolla, Bad Schönborn (DE); Markus Borck, Stuttgart (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/526,487

(22) Filed: Nov. 15, 2021

(65) Prior Publication Data

US 2022/0077511 A1 Mar. 10, 2022

Related U.S. Application Data

(63) Continuation of application No. PCT/EP2020/071565, filed on Jul. 30, 2020.

(30) Foreign Application Priority Data

Jul. 31, 2019 (EP) .................................. 19189435

(51) Int. Cl.
*H01M 10/0563* (2010.01)
*H01M 4/131* (2010.01)
(Continued)

(52) U.S. Cl.
CPC ....... *H01M 10/0563* (2013.01); *H01M 4/131* (2013.01); *H01M 4/133* (2013.01);
(Continued)

(58) Field of Classification Search
CPC .......... H01M 10/0563; H01M 10/056; H01M 10/054; H01M 10/0525; H01M 10/0568;
(Continued)

(56) References Cited

U.S. PATENT DOCUMENTS 4,891,281 A * 1/1990 Kuo ................. H01M 6/14
429/105
6,730,441 B1 5/2004 Hambitzer et al.
(Continued)

FOREIGN PATENT DOCUMENTS

BR 112021022989 A2 2/2022
BR 112021023001 A2 2/2022
(Continued)

OTHER PUBLICATIONS

Rohde et al., Li[B(OCH2CF3)4]: Synthesis, Characterization and Electrochemical Application as a Conducting Salt for LiSB Batteries, ChemPhysChem, 2015, vol. 16, pp. 666-675.
(Continued)

*Primary Examiner* — Laura Weiner
(74) *Attorney, Agent, or Firm* — Bose McKinney & Evans LLP

(57) ABSTRACT

This disclosure relates to a rechargeable battery cell having an active metal, at least one positive electrode, at least one negative electrode, a housing and an electrolyte, the positive electrode comprising at least one compound in the form of a layered oxide as an active material and the electrolyte being based on $SO_2$ and comprising at least one first conducting salt which has the formula (I), Formula (I)

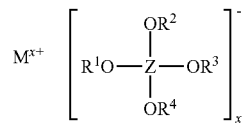

M being a metal selected from the group formed by alkali metals, alkaline earth metals, metals of group 12 of the
(Continued)

periodic table of the elements, and aluminum; x being an integer from 1 to 3; the substituents $R^1$, $R^2$, $R^3$ and $R^4$ being selected independently of one another from the group formed by $C_1$-$C_{10}$ alkyl, $C_2$-$C_{10}$ alkenyl, $C_2$-$C_{10}$ alkynyl, $C_3$-$C_{10}$ cycloalkyl, $C_6$-$C_{14}$ aryl and $C_5$-$C_{14}$ heteroaryl; and Z being aluminum or boron.

47 Claims, 14 Drawing Sheets

(51) Int. Cl.
| | |
|---|---|
| *H01M 4/133* | (2010.01) |
| *H01M 4/36* | (2006.01) |
| *H01M 4/505* | (2010.01) |
| *H01M 4/525* | (2010.01) |
| *H01M 4/587* | (2010.01) |
| *H01M 10/0525* | (2010.01) |
| *H01M 10/054* | (2010.01) |
| *H01M 10/056* | (2010.01) |
| *H01M 10/0567* | (2010.01) |
| *H01M 10/0568* | (2010.01) |
| *H01M 4/02* | (2006.01) |
| *H01M 4/62* | (2006.01) |
| *H01M 4/66* | (2006.01) |
| *H01M 4/74* | (2006.01) |
| *H01M 4/80* | (2006.01) |

(52) U.S. Cl.
CPC .......... *H01M 4/364* (2013.01); *H01M 4/505* (2013.01); *H01M 4/525* (2013.01); *H01M 4/587* (2013.01); *H01M 10/0525* (2013.01); *H01M 10/054* (2013.01); *H01M 10/056* (2013.01); *H01M 10/0567* (2013.01); *H01M 10/0568* (2013.01); *H01M 2004/027* (2013.01); *H01M 2004/028* (2013.01); *H01M 4/622* (2013.01); *H01M 4/623* (2013.01); *H01M 4/661* (2013.01); *H01M 4/745* (2013.01); *H01M 4/808* (2013.01); *H01M 2300/002* (2013.01)

(58) Field of Classification Search
CPC .. H01M 10/0567; H01M 4/525; H01M 4/505; H01M 4/131; H01M 2300/002; H01M 4/133; H01M 4/587; H01M 4/364; H01M 4/622; H01M 4/623; H01M 2004/028; H01M 2004/027; H01M 4/808
See application file for complete search history.

(56) References Cited

U.S. PATENT DOCUMENTS

| 9,263,745 B2 | 2/2016 | Zinck et al. | |
|---|---|---|---|
| 2002/0015884 A1 | 2/2002 | Schmidt et al. | |
| 2005/0106467 A1 | 5/2005 | Hambitzer et al. | |
| 2006/0068293 A1 | 3/2006 | Kim et al. | |
| 2006/0134528 A1* | 6/2006 | Ihara | H01M 10/0568 429/200 |
| 2007/0065714 A1 | 3/2007 | Hambitzer et al. | |
| 2009/0142668 A1 | 6/2009 | Ishii | |
| 2010/0062341 A1 | 3/2010 | Hambitzer | |
| 2011/0287304 A1 | 11/2011 | Zinck et al. | |
| 2013/0032753 A1* | 2/2013 | Yamamoto | H01M 4/525 429/223 |
| 2013/0224603 A1* | 8/2013 | Chen | H01M 4/625 429/188 |
| 2014/0220428 A1 | 8/2014 | Zinck et al. | |
| 2015/0093632 A1 | 4/2015 | Pszolla et al. | |
| 2017/0047612 A1* | 2/2017 | Zinck | H01M 4/136 |
| 2017/0117547 A1 | 4/2017 | Fanous et al. | |
| 2017/0288211 A1 | 10/2017 | Zhamu et al. | |
| 2018/0254516 A1 | 9/2018 | Han et al. | |
| 2018/0277845 A1 | 9/2018 | Yamaya et al. | |
| 2019/0207262 A1 | 7/2019 | Delobel | |
| 2019/0260074 A1 | 8/2019 | Hambitzer | |
| 2021/0036358 A1 | 2/2021 | Zinck et al. | |

FOREIGN PATENT DOCUMENTS

| BR | 112021023003 A2 | 2/2022 |
|---|---|---|
| BR | 112021023657 A2 | 2/2022 |
| BR | 112021022996 A2 | 4/2022 |
| BR | 112021022999 A2 | 4/2022 |
| CN | 101622738 A | 1/2010 |
| CN | 102742049 A | 10/2012 |
| CN | 102742062 A | 10/2012 |
| CN | 105723546 A | 6/2016 |
| CN | 108352515 A | 7/2018 |
| CN | 108630909 A | 10/2018 |
| CN | 109417192 A | 3/2019 |
| EP | 1 201 004 B1 | 12/2004 |
| EP | 2 360 772 A1 | 8/2011 |
| EP | 2 827 430 A1 | 1/2015 |
| EP | 2 534 719 B1 | 1/2017 |
| EP | 2 954 588 B1 | 4/2017 |
| JP | 2001-143750 A | 5/2001 |
| JP | 2001-210332 A | 8/2001 |
| JP | 2002-305026 A | 10/2002 |
| JP | 2003-157896 A | 5/2003 |
| JP | 2008-277001 A | 11/2008 |
| JP | 4306858 B2 | 8/2009 |
| JP | 2013-519967 A | 5/2013 |
| JP | 5901539 B2 | 4/2016 |
| KR | 10-2015-0115788 A | 10/2015 |
| KR | 10-2018-0013512 A | 2/2018 |
| KR | 10-2018-0114256 A | 10/2018 |
| KR | 10-2019-0003940 A | 1/2019 |
| RU | 2248071 C2 | 3/2005 |
| RU | 2 272 043 C2 | 3/2006 |
| RU | 2 325 014 C1 | 5/2008 |
| RU | 2 343 601 C2 | 1/2009 |
| WO | WO 00/79631 A1 | 12/2000 |
| WO | WO 02/00773 A2 | 1/2002 |
| WO | WO 2008/147751 A1 | 12/2008 |
| WO | WO 2012/042005 A1 | 4/2012 |
| WO | WO 2015/074006 A1 | 5/2015 |
| WO | WO 2017/178543 A1 | 10/2017 |
| WO | WO 2018/115024 A1 | 6/2018 |

OTHER PUBLICATIONS

English Translation of International Search Report and Written Opinion of the International Searching Agency, PCT/EP2020/071565, Nov. 16, 2020, 9 pages.

Dreher et al., Rechargeable LiCoO2 in Inorganic Electrolyte Solution, Journal of Power Sources, 1993, vol. 44, No. 1/03, pp. 583-587.

Jung et al., Oxygen Release and Its Effect on the Cycling Stability of LiNixMnyCozO2 (NMC) Cathode Materials for Li-Ion Batteries, Journal of The Electrochemical Society, 2017, vol. 164, No. 7, pp. A1361-A1377.

Tsujioka et al., Conductivities and Electrochemical Stabilities of Lithium Salts of Polyfluoroalkoxyaluminate Superweak Anions, Journal of The Electrochemical Society, 2004, vol. 151, No. 9, pp. A1418-A1423.

Krossing, The Facile Preparation of Weakly Coordinating Anions: Structure and Characterisation of Silverpolyfluoroalkoxyaluminates AgAl(ORF)4, Calculation of the Alkoxide Ion Affinity, 2001, Chem. Eur. J., vol. 7, No. 2, pp. 490-502.

Ivanova et al., Relative Lewis Basicities of Six Al(ORF)4— Superweak Anions and the Structures of LiAl{OCH(CF3)2}4 and [1-Et-3-Me-1,3-C3H3N2]-[Li{Al{OCH(CF3)2}4}2], 2001, Chem. Eur. J., vol. 7, No. 2, pp. 503-510.

Park et al., Performances of Li/LixCoO2 Cells in LiAlCl4 • 3SO2 Electrolyte, Journal of Power Sources, 1997, vol. 68, pp. 338-343.

(56) References Cited

OTHER PUBLICATIONS

Tong et al., Sulfur-containing compounds as electrolyte additives for lithium-ion batteries, InfoMat, 2021, vol. 3, pp. 1364-1392.
Gong et al., Recent advances in the research of polyanion-type cathode materials for Li-ion batteries, Energy & Environmental Science, 2011, vol. 4, pp. 3223-3242.

* cited by examiner

RECHARGEABLE BATTERY CELL

RELATED APPLICATIONS

This application is a continuation of PCT/EP2020/071565, filed Jul. 30, 2020, which claims priority to EP 19 189 435.1, filed Jul. 31, 2019, the entire disclosures of both of which are hereby incorporated herein by reference.

BACKGROUND

This disclosure relates to a rechargeable battery cell having an $SO_2$-based electrolyte.

Rechargeable battery cells are of great importance in many technical fields. They are often used for applications which require only small rechargeable battery cells having relatively low current intensities, for example, for the operation of cell phones. In addition, there is also a great need for larger rechargeable battery cells for high-energy applications, with mass storage of energy in the form of battery cells being of particular importance for the electric propulsion of vehicles.

High energy density is an important requirement for these types of rechargeable battery cells. This means that the rechargeable battery cell should contain as much electrical energy as possible per unit weight and volume. Lithium has proven to be particularly advantageous as an active metal for this purpose. The active metal of a rechargeable battery cell is the metal whose ions within the electrolyte migrate to the negative or positive electrode when the cell is being charged or discharged and participate in electrochemical processes there. These electrochemical processes lead directly or indirectly to the release of electrons into the external circuit or to the absorption of electrons from the external circuit. Rechargeable battery cells comprising lithium as an active metal are also referred to as lithium-ion cells. The energy density of these lithium-ion cells can either be increased by increasing the specific capacity of the electrodes or by increasing the cell voltage.

Both the positive and negative electrodes of lithium-ion cells are designed as insertion electrodes. The term "insertion electrode" in the sense of this disclosure refers to electrodes which have a crystal structure into which ions of the active material can be stored and removed during operation of the lithium-ion cell. This means that the electrode processes can take place not only on the surface of the electrodes, but also within the crystalline structure. Both electrodes typically have a thickness of less than 100 µm and are therefore very thin. When charging the lithium-ion cell, the ions of the active metal are removed from the positive electrode and stored in the negative electrode. The reverse process takes place when the lithium-ion cell is discharged.

The electrolyte is also an important functional element of every rechargeable battery cell. It usually comprises a solvent or a solvent blend and at least one conducting salt. Solid electrolytes or ionic liquids, for example, do not comprise a solvent, but only a conducting salt. The electrolyte is in contact with the positive and negative electrodes of the battery cell. At least one ion of the conducting salt (anion or cation) is sufficiently mobile in the electrolyte such that a charge transport between the electrodes, required for the functioning of the rechargeable battery cell, can take place through ionic conduction. The electrolyte is oxidatively electrochemically decomposed from a certain upper cell voltage of the rechargeable battery cell. This process often leads to an irreversible destruction of the electrolyte components, and thus to a failure of the rechargeable battery cell. Reductive processes can also decompose the electrolyte when falling below a certain cell voltage. In order to avoid these processes, the positive and negative electrodes are chosen such that the cell voltage is below or above the decomposition voltage of the electrolyte. The electrolyte thus determines the voltage window, in the range of which a rechargeable battery cell can be operated reversibly, that is, repeatedly charged and discharged.

The lithium-ion cells known from the prior art comprise an electrolyte consisting of an organic solvent or solvent blend and a conducting salt dissolved therein. The conducting salt is a lithium salt such as lithium hexafluorophosphate ($LiPF_6$). The solvent blend can comprise, for example, ethylene carbonate. The electrolyte LP57, which has the composition 1 M $LiPF_6$ in EC:EMC 3:7, is an example of such an electrolyte. Due to the organic solvent or solvent blend, these kinds of lithium ion cells are also referred to as organic lithium-ion cells.

The negative electrode of these organic lithium-ion cells consists of a carbon coating which is applied to a discharge element made of copper. The discharge element provides the electronically conductive connection required between the carbon coating and the external circuit. The positive electrode consists of lithium cobalt oxide ($LiCoO_2$), which is applied to a discharge element made of aluminum.

It has long been known that unintentional overcharging of organic lithium ion cells leads to the irreversible decomposition of electrolyte components. The oxidative decomposition of the organic solvent and/or the conducting salt takes place on the surface of the positive electrode. The reaction heat generated during this decomposition and the resulting gaseous products are responsible for the subsequent so-called "thermal runaway" and the resulting destruction of the organic lithium ion cell. The vast majority of charging protocols for these organic lithium-ion cells use the cell voltage as an indicator of the end of charging. Accidents caused by the thermal runaway are particularly likely to occur when using multi-cell battery packs in which a plurality of organic lithium-ion cells having dissimilar capacities are connected in series.

Organic lithium-ion cells are therefore problematic in terms of their stability and long-term operational reliability. Safety risks are also caused in particular by the flammability of the organic solvent or solvent blend. When an organic lithium-ion cell catches fire or even explodes, the organic solvent in the electrolyte forms a combustible material. Additional measures must be taken to avoid such safety risks. These measures include, in particular, a very precise regulation of the charging and discharging processes of the organic lithium-ion cell and an optimized battery design. Furthermore, the organic lithium-ion cell comprises components which melt in the event of an unintentional increase in temperature and can thereby flood the organic lithium-ion cell with molten plastic. A further uncontrolled increase in temperature is thus prevented. However, these measures lead to increased production costs in the manufacture of the organic lithium-ion cell and to an increased volume and weight. Furthermore, these measures reduce the energy density of the organic lithium-ion cell.

A further disadvantage of organic lithium-ion cells is that any hydrolysis products produced in the presence of residual amounts of water are very aggressive towards the cell components of the rechargeable battery cell. For example, the conducting salt $LiPF_6$, which is often used in organic cells, produces very reactive, aggressive hydrogen fluoride (HF) through reaction with traces of water. Because of this, when manufacturing such rechargeable battery cells having an organic electrolyte, attention must be paid to minimizing the residual water content comprised in the electrolyte and the cell components. Production therefore often takes place in costly drying rooms under extremely low humidity. The issues described above regarding stability and long-term operational reliability are of particular importance for the development of organic lithium-ion cells, which, on the one hand, are characterized by a high energy and power density level, and, on the other hand, by a very high degree of operational reliability and a very long service life, including a particularly high number of usable charge and discharge cycles.

In order to increase the energy density of organic lithium-ion cells, new cathode materials were tested in the prior art, that is, new materials for positive electrodes which can be cycled with a higher end-of-charge voltage, that is, a higher upper potential. Such materials are, for example, lithium nickel manganese cobalt oxides, which are also referred to as NMC for short. The following publication reports on it:

"Oxygen Release and Its Effect on the Cycling Stability of $LiNi_xMn_yCo_zO_2$ (NMC) Cathode Materials for Li-Ion Batteries"

Roland Jung; Michael Metzger; Filippo Maglia; Christoph Stinner and Hubert A. Gasteigera. *Journal of The Electrochemical Society*, 164 (7) A1361-41377 (2017)

This publication by Jung et al. is referred to below as [V1]. Jung et al. tested various NMC materials having the composition NMC (xyz) in [V1]. The lowercase letters (xyz) in brackets specify the indices x, y and z of the compound $LiNi_xMn_yCo_zO_2$. In [V1], three different NMC cathode materials were cycled in an organic lithium-ion cell having the previously described LP57 electrolyte (1 M $LiPF_6$ in EC:EMC 3:7) using different end-of-charge voltages. The end-of-charge voltage is the voltage up to which an individual battery cell or a battery made of a plurality of battery cells is charged with the aid of a battery charger. The batteries are often charged with a certain charge current intensity up to a certain upper potential, that is, up to the end-of-charge voltage. The corresponding upper potential is held until the charge current has dropped to a certain value. 300 charge/discharge cycles were respectively performed in [V1]. Table 1 below shows the reduction in the discharge capacity of the 5th cycle compared to the 300th. cycle specified in %.

TABLE 1

Discharge Capacities with Increasing End-of-Charge Voltages from [V1] by Jung et al.

| Material | 4.0 V Discharge Capacity [%]: | 4.2 V Discharge Capacity [%]: | 4.4 V Discharge Capacity [%]: | 4.6 V Discharge Capacity [%]: |
|---|---|---|---|---|
| NMC(111) | — | 93% | 94% | 42% |
| NMC(622) | — | 95% | 94% | 39% |
| NMC(811) | 90% | 77% | 66% | — |

Table 1 shows that with materials NMC (111) and NMC (622), there is a drastic decrease in capacity when cycling with an end-of-charge voltage of 4.6 volts, because only 42% and 39% of the original capacity are achieved. The material NMC (811) was only cycled up to 4.4 volts, wherein a steady decrease in capacity with increasing end-of-charge voltage was also observed. On the basis of [V1], it can therefore be determined that organic lithium-ion cells having the NMC cathode materials can be cycled at a higher upper potential. The disadvantage, however, is that there is an undesirably high decrease in capacity.

A further development known from prior art therefore provides for the use of an electrolyte based on sulfur dioxide ($SO_2$) instead of an organic electrolyte for rechargeable battery cells. Rechargeable battery cells, which comprise an $SO_2$-based electrolyte, exhibit, among other things, high ionic conductivity. The term "$SO_2$-based electrolyte" in the sense of this disclosure refers to an electrolyte which comprises $SO_2$ not merely as an additive at low concentrations, but in which the mobility of the ions in the conducting salt, which is comprised in the electrolyte and which causes the charge transport, is at least in part, largely or even completely ensured by $SO_2$. The $SO_2$ thus serves as a solvent for the conducting salt. The conducting salt can form a liquid solvate complex with the gaseous $SO_2$, whereby the $SO_2$ is bound and the vapor pressure is noticeably reduced compared to the pure $SO_2$. Electrolytes having low vapor pressure are produced. Compared to the organic electrolytes described above, these $SO_2$-based electrolytes have the advantage of being non-combustible. Safety risks, which might occur due to the electrolyte's flammability, can thus be excluded.

For example, EP 1 201 004 B1 discloses an $SO_2$-based electrolyte having the composition $LiAlCl_4*SO_2$ in combination with a positive electrode made of $LiCoO_2$ (hereinafter referred to as [V2]). [V2] suggests the use of an additional salt to avoid disruptive decomposition reactions, such as the undesired formation of chlorine ($Cl_2$) from lithium tetrachloroaluminate ($LiAlCl_4$), when the rechargeable battery cell is overcharged from an upper potential of 4.1 to 4.2 volts.

EP 2534719 B1 (hereinafter referred to as [V3]) also discloses an $SO_2$-based electrolyte having, among other things, $LiAlCl_4$ as the conducting salt. For example, said $LiAlCl_4$ forms complexes of the formula $LiAlCl_4*1.5$ mol $SO_2$ or $LiAlCl_4*6$ mol $SO_2$ with the $SO_2$. Lithium iron phosphate ($LiFePO_4$) is used as the positive electrode in [V3]. $LiFePO_4$ has a lower end-of-charge voltage (3.7 V) compared to $LiCoO_2$ (4.2 V). The problem of undesired overcharging reactions does not arise in this rechargeable battery cell, since upper potentials of 4.1 volts, which are harmful to the electrolyte, are not reached. A disadvantage that also occurs, among other things, with these $SO_2$-based electrolytes is that any hydrolysis products formed in the presence of residual amounts of water react with the cell components of the rechargeable battery cell and thus lead to the formation of undesired by-products. Because of this, in the manufacture of such rechargeable battery cells having an $SO_2$-based electrolyte, attention should be paid to minimizing the residual water content comprised in the electrolyte and the cell components.

A further problem with the $SO_2$-based electrolytes is that many conducting salts, in particular also known for organic lithium-ion cells, are not soluble in $SO_2$. Measurements showed that $SO_2$ is a poor solvent for many conducting salts, such as lithium fluoride (LiF), lithium bromide (LiBr), lithium sulfate ($Li_2SO_4$), lithium bis(oxalato)borate (LiBOB), lithium hexafluoroarsenate ($LiAsF6$), lithium tetrafluoroborate ($LiBF_4$), trilithium hexafluoroaluminate ($Li_3AlF_6$), lithium hexafluoroantimonate ($LiSbF_6$), lithium difluoro(oxalato)borate ($LiBF_2C_2O_4$), lithium bis(trifluoromethanesulfonyl)imide (LiTFSI), lithium metaborate ($LiBO_2$), lithium aluminate ($LiAlO_2$), lithium triflate ($LiCF_3SO_3$) and lithium chlorosulfonate ($LiSO_3Cl$). The solubility of these conducting salts in $SO_2$ is approx. $10^{-2}$-$10^{-4}$ mol/L (see Table 2). With these low salt concentrations, it can be assumed that there are at most only low conductivities, which are not sufficient for the useful operation of a rechargeable battery cell.

TABLE 2

Solubility of various salts in $SO_2$

| Conducting salt | Solubility/ mol/L in $SO_2$ | Conducting salt | Solubility/ mol/L in $SO_2$ |
|---|---|---|---|
| LiF | $2.1 \cdot 10^{-3}$ | $LiPF_6$ | $1.5 \cdot 10^{-2}$ |
| LiBr | $4.9 \cdot 10^{-3}$ | $LiSbF_6$ | $2.8 \cdot 10^{-4}$ |
| $Li_2SO_4$ | $2.7 \cdot 10^{-4}$ | $LiBF_2(C_2O_4)$ | $1.4 \cdot 10^{-4}$ |
| $LiB(C_2O_4)_2$ | $3.2 \cdot 10^{-4}$ | $CF_3SO_2NLiSO_2CF_3$ | $1.5 \cdot 10^{-2}$ |
| $Li_3PO_4$ | — | $LiBO_2$ | $2.6 \cdot 10^{-4}$ |
| $Li_3AlF_6$ | $2.3 \cdot 10^{-3}$ | $LiAlO_2$ | $4.3 \cdot 10^{-4}$ |
| $LiBF_4$ | $1.7 \cdot 10^{-3}$ | $LiCF_3SO_3$ | $6.3 \cdot 10^{-4}$ |
| $LiAsF_6$ | $1.4 \cdot 10^{-3}$ | | |

In order to further improve the possible uses and properties of rechargeable battery cells that comprise an $SO_2$-based electrolyte, the object of this disclosure is to specify a rechargeable battery cell having an $SO_2$-based electrolyte, which, compared to the rechargeable battery cells known from the prior art:
- has a wide electrochemical window, so that no oxidative electrolyte decomposition occurs at the positive electrode;
- has a stable coating layer on the negative electrode, whereby the coating layer capacity should be low and no further reductive electrolyte decomposition should occur on the negative electrode during further operation;
- comprises an $SO_2$-based electrolyte which exhibits good solubility for conducting salts and is therefore a good ion conductor and electronic insulator, so that ion transport can be facilitated and self-discharge can be reduced to a minimum;
- comprises an $SO_2$-based electrolyte that is also inert to other components of the rechargeable battery cell, such as separators, electrode materials and cell packaging materials;
- is resistant against various misuses such as electrical, mechanical or thermal;
- comprises an $SO_2$-based electrolyte, which exhibits an increased stability against residual amounts of water in the cell components of rechargeable battery cells;
- exhibits improved electrical performance data, in particular high energy density;
- has improved overcharging and deep discharging and less self-discharge and
- shows an increased service life, in particular a high number of usable charge and discharge cycles.

Such rechargeable battery cells should, in particular, also have very good electrical energy and performance data, high operational reliability and service life, in particular a large number of usable charge and discharge cycles, without the electrolyte decomposing during operation of the rechargeable battery cell.

SUMMARY

A rechargeable battery cell according to this disclosure comprises an active metal, at least one positive electrode, at least one negative electrode, a housing and an electrolyte. The positive electrode comprises at least one compound in the form of a layered oxide as an active material. The electrolyte is based on $SO_2$ and comprises at least one first conducting salt. Said first conducting salt has the formula (I).

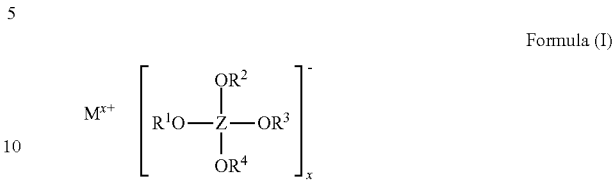

Formula (I)

In formula (I), M is a metal selected from the group formed by alkali metals, alkaline earth metals, metals of group 12 of the periodic table of the elements and aluminum. x is an integer from 1 to 3. The substituents $R^1$, $R^2$, $R^3$ and $R^4$ are selected independently of one another from the group formed by $C_1$-$C_{10}$ alkyl, $C_2$-$C_{10}$ alkenyl, $C_2$-$C_{10}$ alkynyl, $C_3$-$C_{10}$ cycloalkyl, $C_6$-$C_{14}$ aryl and $C_5$-$C_{14}$ heteroaryl. The central atom Z is either aluminum or boron.

In the sense of this disclosure, the term "layered oxides" refers to metal oxides which are derived from the α-$NaFeO_2$ structure type. In this structure type, the oxygen atoms occupy the lattice positions of a face-centered cubic lattice (so-called fcc lattice), in which the metal ions occupy the octahedral holes that are present.

The $SO_2$-based electrolyte used in the rechargeable battery cell according to this disclosure comprises $SO_2$ not only as an additive in low concentration, but in concentrations at which the mobility of the ions of the first conducting salt, which is comprised in the electrolyte and causes the charge transport, is at least partially, largely or even completely ensured by the $SO_2$. The first conducting salt is dissolved in the electrolyte and shows very good solubility therein. It can form a liquid solvate complex with the gaseous $SO_2$, in which the $SO_2$ is bound. In this case, the vapor pressure of the liquid solvate complex is noticeably reduced compared to the pure $SO_2$, producing electrolytes that have a low vapor pressure. However, it is also within the scope of this disclosure that, depending on the chemical structure of the first conducting salt according to formula (I), no reduction in vapor pressure can occur in the production of the electrolyte according to this disclosure. In the last-mentioned case, it is preferred for the production of the electrolyte according to this disclosure to be carried out at low temperature or under pressure. The electrolyte may also comprise a plurality of conducting salts of the formula (I), which differ from one another in their chemical structure.

In the sense of this disclosure, the term "$C_1$-$C_{10}$ alkyl" includes linear or branched saturated hydrocarbon groups having one to ten carbon atoms. These include, in particular, methyl, ethyl, n-propyl, isopropyl, n-butyl, sec-butyl, iso-butyl, tert-butyl, n-pentyl, iso-pentyl, 2,2-dimethylpropyl, n-hexyl, iso-hexyl, 2-ethylhexyl, n-heptyl, iso-heptyl, n-octyl, iso-octyl, n-nonyl, n-decyl and the like.

In the sense of this disclosure, the term "$C_2$-$C_{10}$ alkenyl" includes unsaturated linear or branched hydrocarbon groups having two to ten carbon atoms, wherein the hydrocarbon groups have at least one C—C double bond. These include, in particular, ethenyl, 1-propenyl, 2-propenyl, 1-n-butenyl, 2-n-butenyl, isobutenyl, 1-pentenyl, 1-hexenyl, 1-heptenyl, 1-octenyl, 1-nonenyl, 1-decenyl and the like.

In the sense of this disclosure, the term "$C_2$-$C_{10}$ alkynyl" includes unsaturated linear or branched hydrocarbon groups having two to ten carbon atoms, wherein the hydrocarbon groups have at least one C—C triple bond. This includes, in particular, ethynyl, 1-propynyl, 2-propynyl, 1-n-butynyl, 2-n-butynyl, isobutynyl, 1-pentynyl, 1-hexynyl, 1-heptynyl, 1-octynyl, 1-nonynyl, 1-decynyl, and the like.

In the sense of this disclosure, the term "$C_3$-$C_{10}$ cycloalkyl" includes cyclic, saturated hydrocarbon groups having three to ten carbon atoms. These include, in particular, cyclopropyl, cyclobutyl, cyclopentyl, cyclohexyl, cycloheptyl, cyclohexyl, cyclononyl and cyclodecanyl.

In the sense of this disclosure, the term "$C_6$-$C_{14}$ aryl" includes aromatic hydrocarbon groups having six to fourteen ring carbon atoms. This includes, in particular, phenyl ($C_6H_5$ group), naphthyl ($C_{10}H_7$ group) and anthracyl ($C_{14}H_9$ group).

In the sense of this disclosure, the term "$C_5$-$C_{14}$ heteroaryl" includes aromatic hydrocarbon groups having five to fourteen ring hydrocarbon atoms in which at least one hydrocarbon atom is replaced by a nitrogen, oxygen or sulfur atom. These include, in particular, pyrrolyl, furanyl, thiophenyl, pyrridinyl, pyranyl, thiopyranyl and the like. All of the hydrocarbon groups mentioned above are each bonded to the central atom according to formula (I) via the oxygen atom.

A rechargeable battery cell having such an electrolyte has the advantage over rechargeable battery cells having electrolytes known from the prior art in that the first conducting salt comprised therein has higher oxidation stability and consequently shows essentially no decomposition at higher cell voltages. Said electrolyte is resistant to oxidation, preferably at least up to an upper potential of 4.0 volts, more preferably at least up to an upper potential of 4.2 volts, more preferably at least up to an upper potential of 4.4 volts, more preferably at least up to an upper potential of 4.6 volts, more preferably at least up to an upper potential of 4.8 volts and most preferably at least up to an upper potential of 5.0 volts. Thus, when using such an electrolyte in a rechargeable battery cell, there is little or no electrolyte decomposition within the working potentials, that is, in the range between the end-of-charge voltage and the end-of-discharge voltage of both electrodes of the rechargeable battery cell. As a result, rechargeable battery cells, for example, can have an end-of-charge voltage of at least 4.0 volts, more preferably of at least 4.4 volts, more preferably of at least 4.8 volts, more preferably of at least 5.2 volts, more preferably of at least 5.6 volts and most preferably of at least 6.0 volts.

The service life of the rechargeable battery cell comprising this electrolyte is significantly longer than that of rechargeable battery cells comprising electrolytes known from the prior art.

Furthermore, a rechargeable battery cell having such an electrolyte is also resistant to low temperatures. At a temperature of −40° C., for example, 61% of the charged capacity can still be discharged. The conductivity of the electrolyte at low temperatures is sufficient to operate a battery cell.

Furthermore, a rechargeable battery cell having such an electrolyte exhibits increased stability with respect to residual amounts of water. If there are still small residual amounts of water in the electrolyte (in the range of ppm), the electrolyte or the first conducting salt forms hydrolysis products with the water, which products, compared to the $SO_2$-based electrolytes known from the prior art, are significantly less aggressive towards the cell components. Because of this, the absence of water in the electrolyte plays a less important role in $SO_2$-based electrolytes in comparison to those known from the prior art. These advantages of the electrolyte according to this disclosure outweigh the disadvantage that arises from the fact that the first conducting salt according to formula (I) has a significantly larger anion size than the conducting salts known from the prior art. This higher anion size leads to a lower conductivity of the first conducting salt according to formula (I) compared to the conductivity of $LiAlCl_4$.

Positive Electrode

Advantageous developments of the rechargeable battery cell according to this disclosure with regard to the positive electrode are described below.

The positive electrode comprises at least one compound in the form of a layered oxide as an active material. Said active material can store ions of the active metal and release and take up the ions of the active metal during operation of the battery cell.

In a first advantageous development of the rechargeable battery cell according to this disclosure, the compound has the composition $A_xM'_yM''_zO_a$. In this composition, $A_xM'_yM''_zO_a$ A is at least one metal selected from the group formed by the alkali metals, the alkaline earth metals, the metals of group 12 of the periodic table or aluminum, M' is at least one metal selected from the group formed by the elements Ti, V, Cr, Mn, Fe, Co, Ni, Cu and Zn;

M" is at least one element selected from the group formed by the elements of groups 2, 3, 4, 5, 6, 7, 8, 9, 10, 11, 12, 13, 14, 15 and 16 of the periodic table of the elements;

x and y independently of one another are numbers greater than 0;

z is a number greater than or equal to 0; and a is a number greater than 0.

A is preferably the metal lithium, that is, the compound can have the composition $Li_xM'_yM''_zO_a$.

These layered oxides are oxides derived from the α-$NaFeO_2$ structure type. The oxygen atoms occupy the lattice sites of a face-centered cubic lattice (so-called fcc lattice); the metal ions A and the metal cations M' and M" occupy the existing octahedral holes. In the structure constructed in this way, there is an order/separation of lithium and the transition metals on alternating layers along the cubic direction. If an excess of metal ions A is used, these can be integrated into the layer of metal cations M' and M".

The indices y and z in the composition $A_xM'_yM''_zO_a$ relate to the totality of metals and elements that are represented by M' and M", respectively. If, for example, M' comprises two metals M'1 and M'2, the following applies to the index y: y=y1+y2, wherein y1 and y2 represent the indices of the metals M'1 and M'2. The numbers or indices x, y, z and a must be chosen such that there is charge neutrality within the composition.

Examples of compounds in which M' comprises two metals are lithium nickel manganese cobalt oxides of the composition $Li_xNi_{y1}Mn_{y2}Co_zO_2$ with M'$^1$=Ni, M'$^2$=Mn and M"=Co. Examples of compounds in which z=0, that is, which have no further metal or element M", are lithium cobalt oxides $Li_xCo_yO_a$.

An advantageous development of the rechargeable battery cell according to this disclosure provides that A is lithium and M' is cobalt, wherein x and y are preferably equal to 1, z is equal to 0 and a is preferably equal to 2. These are preferably compositions of the formula $Li_xCo_yO_a$, that is, lithium cobalt oxides. The compound $LiCoO_2$ is an example of a lithium cobalt oxide.

A further advantageous development of the rechargeable battery cell according to this disclosure provides that M' consists of the metals nickel and manganese and M" is cobalt. In this composition of the formula $Li_xNi_{y1}Mn_{y2}Co_zO_a$, x, y1 and y2 are, independently of one another, numbers greater than 0, z is a number greater than or equal to 0, and a is a number greater than 0. These can be compositions of the formula $Li_xNi_{y1}Mn_{y2}Co_zO_2$ (NMC), that is, lithium nickel manganese cobalt oxide. Examples of these lithium nickel manganese cobalt oxide active materials are $LiNi_{1/3}Mn_{1/3}Co_{1/3}O_2$ (NMC111), $LiNi_{0.6}Mn_{0.2}Co_2O_2$ (NMC622) and $LiNi_{0.8}Mn_{0.1}Co_{0.1}O_2$ (NMC811). Further compounds of lithium nickel manganese cobalt oxide can have the composition $LiNi_{0.5}Mn_{0.3}Co_{0.2}O_2$, $LiNi_{0.5}Mn_{0.25}Co_{0.25}O_2$, $LiNi_{0.52}Mn_{0.32}Co_{0.16}O_2$, $LiNi_{0.55}Mn_{0.30}Co_{0.15}O_2$, $LiNi_{0.58}Mn_{0.14}Co_{0.28}O_2$, $LiNi_{0.64}Mn_{0.18}Co_{0.18}O_2$, $LiNi_{0.65}Mn_{0.27}Co_{0.08}O_2$, $LiNi_{0.7}Mn_{0.2}Co_{0.1}O_2$, $LiNi_{0.7}Mn_{0.15}Co_{0.15}O_2$, $LiNi_{0.72}Mn_{0.10}Co_{0.18}O_2$, $LiNi_{0.76}Mn_{0.14}Co_{0.10}O_2$, $LiNi_{0.86}Mn_{0.04}Co_{0.10}O_2$, $LiNi_{0.90}Mn_{0.05}Co_{0.05}O_2$, $LiNi_{0.95}Mn_{0.025}Co_{0.025}O_2$ or a combination thereof. Electrodes for rechargeable battery cells having a cell voltage of, for example, over 4.6 volts can be produced using these compounds.

A further advantageous development of the rechargeable battery cell according to this disclosure provides that the active material is a metal oxide which is rich in lithium and manganese (lithium and manganese-rich oxide material). These materials can be described with the following formulas: $Li_xMn_yM''_zO_a$. M' of the formula $Li_xM'_yM''_zO_a$ described above thus represents the metal manganese (Mn). M" is, as defined above, at least one element selected from the group formed by the elements of groups 2, 3, 4, 5, 6, 7, 8, 9, 10, 11, 12, 13, 14, 15 and 16 of the periodic table of the elements. The index x here is greater than or equal to 1, the index y is greater than the index z or greater than the sum of the indices z1+z2+z3 etc. For example, if M" comprises two metals $M''^1$ and $M''^2$ with the indices z1 and z2 (for example, $Li_{1.2}Mn_{0.525}Ni_{0.175}Co_{0.1}O_2$ with $M''^1$=Ni z1=0.175 and $M''^2$=Co z2=0.1), the following applies for the index y: y>z1+z2, The index z is greater than or equal to 0 and the index a is greater than 0. The indices x, y, z and a must be chosen such that there is charge neutrality within the composition. Metal oxides which are rich in lithium and manganese can also be described by the formula:

$mLi_2MnO_3 \cdot (1-m)LiM'O_2$ with $0<m<1$. Examples of such compounds are $Li_{1.2}Mn_{0.525}Ni_{0.175}Co_{0.1}O_2, Li_{1.2}Mn_{0.6}Ni_{0.2}O_2$, $Li_{1.2}Ni_{0.13}Co_{0.13}Mn_{0.54}O_2$ or $Li_{1.16}Mn_{0.61}Ni_{0.15}Co_{0.16}O_2$.

It is within the scope of this disclosure for the positive electrode to comprise at least one of the described layered oxide compounds or a combination of the layered oxide compounds as the active material. A combination of the layered oxide compounds refers to a positive electrode which comprises at least two of the materials described.

It is also within the scope of this disclosure for the positive electrode to also comprise, as an active material, a combination of at least one of the layered oxide compounds described above and at least one further compound which is not a layered oxide compound. The combination can also comprise a plurality of the layered oxide compounds described above and/or a plurality of further compounds that are not layered oxide compounds. Said further compound can, for example, be a polyanionic compound, such as lithium manganese iron phosphate.

A further advantageous development of the battery cell according to this disclosure provides that the positive electrode has a discharge element. This means that the positive electrode also comprises a discharge element in addition to the active material. Said discharge element serves to enable the required electronically conductive connection of the active material of the positive electrode. For this purpose, the discharge element is in contact with the active material involved in the electrode reaction of the positive electrode.

Said discharge element can be designed in a planar manner in the form of a thin metal sheet or a thin metal foil. The thin metal foil preferably has a perforated or mesh-like structure. The planar discharge element can also consist of a plastic film coated with metal. Said metal coatings have a thickness in the range from 0.1 μm to 20 μm. The active material of the positive electrode is preferably applied to the surface of the thin metal sheet, the thin metal foil or the metal-coated plastic foil. The active material can be applied to the front and/or the rear side of the planar discharge element. Such planar discharge elements have a thickness in the range from 5 μm to 50 μm. A thickness of the planar discharge element in the range from 10 μm to 30 μm is preferred. When using planar discharge elements, the positive electrode can have a total thickness of at least 20 μm, preferably at least 40 μm and particularly preferably at least 60 μm. The maximum thickness is at most 200 μm, preferably at most 150 μm and particularly preferably at most 100 μm. The area-specific capacity of the positive electrode based on the coating on one side is preferably at least 0.5 $mAh/cm^2$ when using a planar discharge element, wherein the following values are further preferred in this order: 1 $mAh/cm^2$, 3 $mAh/cm^2$, 5 $mAh/cm^2$, 10 $mAh/cm^2$, 15 $mAh/cm^2$, 20 $mAh/cm^2$.

Furthermore, there is also the possibility for the discharge element of the positive electrode to be designed three-dimensionally in the form of a porous metal structure, in particular in the form of a metal foam. The three-dimensional porous metal structure is sufficiently porous such that the active material of the positive electrode can be incorporated into the pores of the metal structure. The amount of active material incorporated or applied is the loading on the positive electrode. When the discharge element is designed three-dimensionally in the form of a porous metal structure, in particular in the form of a metal foam, then the positive electrode preferably has a thickness of at least 0.2 mm, more preferably at least 0.3 mm, more preferably at least 0.4 mm, more preferably at least 0.5 mm and most preferably at least 0.6 mm. A further advantageous embodiment provides that the area-specific capacity of the positive electrode when using a three-dimensional discharge element, in particular in the form of a metal foam, is preferably at least 2.5 $mAh/cm^2$, wherein the following values are further preferred in this order: 5 $mAh/cm^2$, 15 $mAh/cm^2$, 25 $mAh/cm^2$, 35 $mAh/cm^2$, 45 $mAh/cm^2$, 55 $mAh/cm^2$, 65 $mAh/cm^2$, 75 $mAh/cm^2$. When the discharge element is designed three-dimensionally in the form of a porous metal structure, in particular in the form of a metal foam, the amount of active material of the positive electrode, that is, the loading of the electrode, based on its area, is at least 10 $mg/cm^2$, preferably at least 20 $mg/cm^2$, more preferably at least 40 $mg/cm^2$, more preferably at least 60 $mg/cm^2$, more preferably at least 80 $mg/cm^2$ and most preferably at least 100 $mg/cm^2$. This loading of the positive electrode has a positive effect on the charging process and the discharging process of the rechargeable battery cell.

In a further advantageous development of the battery cell according to this disclosure, the positive electrode has at least one binder. Said binder is preferably a fluorinated binder, in particular a polyvinylidene fluoride and/or a terpolymer which is formed from tetrafluoroethylene, hexafluoropropylene and vinylidene fluoride. However, it can also be a binder which consists of a polymer which is composed of monomeric structural units of a conjugated carboxylic acid or of the alkali, alkaline earth or ammonium salt of this conjugated carboxylic acid or of a combination thereof. Furthermore, the binder can also consist of a polymer based on monomeric styrene and butadiene structural units. In addition, the binder can also be a binder from the group of carboxymethyl celluloses. The binder is present in the positive electrode, preferably in a concentration of at most 20% by weight, more preferably at most 15% by weight, more preferably at most 10% by weight, more preferably at most 7% by weight, more preferably at most 5% by weight and most preferably at most 2% by weight based on the total weight of the positive electrode.

Electrolyte

Advantageous developments of the rechargeable battery cell with regard to the $SO_2$-based electrolyte are described below.

In a further advantageous embodiment of the rechargeable battery cells, the substituents $R^1$, $R^2$, $R^3$ and $R^4$ of the first conducting salt are selected independently of one another from the group formed by:
- $C_1$-$C_6$ alkyl; preferably from $C_2$-$C_4$ alkyl; particularly preferably from the alkyl groups 2-propyl, methyl and ethyl;
- $C_2$-$C_6$ alkenyl; preferably from $C_2$-$C_4$ alkenyl; particularly preferably from the alkenyl groups ethenyl and propenyl;
- $C_2$-$C_6$ alkynyl; preferably from $C_2$-$C_4$ alkynyl;
- $C_3$-$C_6$ cycloalkyl;
- phenyl; and
- $C_5$-$C_7$ heteroaryl.

In the case of this advantageous embodiment of the $SO_2$-based electrolyte, the term "$C_1$-$C_6$ alkyl" includes linear or branched saturated hydrocarbon groups having one to six hydrocarbon groups, in particular methyl, ethyl, n-propyl, isopropyl, n-butyl, sec-butyl, iso-butyl, tert-butyl, n-pentyl, iso-pentyl, 2,2-dimethylpropyl, n-hexyl and iso-hexyl. $C_2$-$C_4$ alkyls are preferred among these. The $C_2$-$C_4$ alkyls 2-propyl, methyl and ethyl are particularly preferred.

In the case of this advantageous embodiment of the $SO_2$-based electrolyte, the term "$C_2$-$C_6$ alkenyl" includes unsaturated linear or branched hydrocarbon groups having two to six carbon atoms, wherein the hydrocarbon groups have at least one C—C double bond. These include in particular ethenyl, 1-propenyl, 2-propenyl, 1-n-butenyl, 2-n-butenyl, isobutenyl, 1-pentenyl and 1-hexenyl, wherein $C_2$-$C_4$ alkenyls are preferred. Ethenyl and 1-propenyl are particularly preferred.

In the case of this advantageous embodiment of the $SO_2$-based electrolyte, the term "$C_2$-$C_6$ alkynyl" includes unsaturated linear or branched hydrocarbon groups having two to six carbon atoms, wherein the hydrocarbon groups have at least one C—C triple bond. These include in particular ethynyl, 1-propynyl, 2-propynyl, 1-n-butynyl, 2-n-butynyl, iso-butynyl, 1-pentynyl and 1-hexynyl. Preferred among these are $C_2$-$C_4$ alkynyls.

In the case of this advantageous embodiment of the $SO_2$-based electrolyte, the term "$C_3$-$C_6$ cycloalkyl" includes cyclic saturated hydrocarbon groups having three to six carbon atoms. These include in particular cyclopropyl, cyclobutyl, cyclopentyl and cyclohexyl.

In the case of this advantageous embodiment of the $SO_2$-based electrolyte, the term "$C_5$-$C_7$ heteroaryl" includes phenyl and naphthyl.

To improve the solubility of the first conducting salt in the $SO_2$-based electrolytes, the substituents $R^1$, $R^2$, $R^3$ and $R^4$ are substituted, in a further advantageous embodiment of the rechargeable battery cell, by at least one fluorine atom and/or by at least one chemical group, wherein the chemical group is selected from the group formed by $C_1$-$C_4$ alkyl, $C_2$-$C_4$ alkenyl, $C_2$-$C_4$ alkynyl, phenyl and benzyl. The chemical groups $C_1$-$C_4$ alkyl, $C_2$-$C_4$ alkenyl, $C_2$-$C_4$ alkynyl, phenyl and benzyl have the same properties or chemical structures as the hydrocarbon groups described above. Substituted in this context means that individual atoms or groups of atoms of the substituents $R^1$, $R^2$, $R^3$ and $R^4$ have been replaced by the fluorine atom and/or by the chemical group.

A particularly high solubility of the first conducting salt in the $SO_2$-based electrolytes can be achieved by at least one of the substituents $R^1$, $R^2$, $R^3$ and $R^4$ being a $CF_3$ group or an $OSO_2CF_3$ group.

In a further advantageous development of the rechargeable battery cell, the first conducting salt is selected from the group formed by:

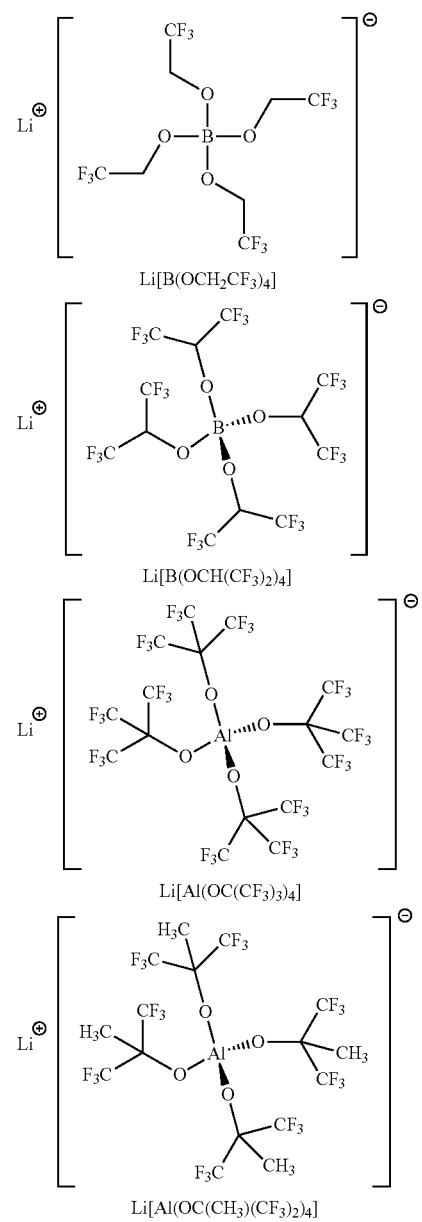

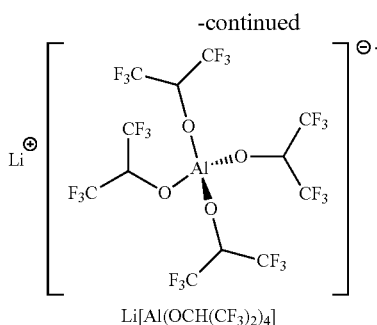

Li[Al(OCH(CF$_3$)$_2$)$_4$]

In order to adjust the conductivity and/or other properties of the electrolyte to a desired value, the electrolyte in a further advantageous embodiment of the rechargeable battery cell according to this disclosure has at least one second conducting salt different from the first conducting salt according to formula (I). This means that, in addition to the first conducting salt, the electrolyte can comprise a or even further second conducting salts which differ from the first conducting salt in their chemical composition and their chemical structure.

In a further advantageous embodiment of the rechargeable battery cell according to this disclosure, the second conducting salt is an alkali metal compound, in particular a lithium compound. The alkali metal compound or the lithium compound are selected from the group formed by an aluminate, a halide, an oxalate, a borate, a phosphate, an arsenate and a gallate. The second conducting salt is preferably a lithium tetrahaloaluminate, in particular LiAlCl$_4$.

Furthermore, in a further advantageous embodiment of the rechargeable battery cell according to this disclosure, the electrolyte comprises at least one additive. This additive is preferably selected from the group formed by vinylene carbonate and its derivatives, vinylethylene carbonate and its derivatives, methylethylene carbonate and its derivatives, lithium (bisoxalato)borate, lithium difluoro(oxalato)borate, lithium tetrafluoro(oxalato)phosphate, lithium oxalate, 2-vinylpyridine, 4-vinylpyridine, cyclic exomethylene carbonates, sultones, cyclic and acyclic sulfonates, acyclic sulfites, cyclic and acyclic sulfinates, organic esters of inorganic acids, acyclic and cyclic alkanes, which acyclic and cyclic alkanes have a boiling point of at least 36° C. at 1 bar, aromatic compounds, halogenated cyclic and acyclic sulfonylimides, halogenated cyclic and acyclic phosphate esters, halogenated cyclic and acyclic phosphines, halogenated cyclic and acyclic phosphites, halogenated cyclic and acyclic phosphazenes, halogenated cyclic and acyclic silylamines, halogenated cyclic and acyclic halogenated esters, halogenated cyclic and acyclic amides, halogenated cyclic and acyclic anhydrides and halogenated organic heterocycles.

In relation to the total weight of the electrolyte composition, the electrolyte has the following composition in a further advantageous development of the rechargeable battery cell:
 (i) 5 to 99.4% by weight sulfur dioxide,
 (ii) 0.6 to 95% by weight of the first conducting salt,
 (iii) 0 to 25% by weight of the second conducting salt and
 (iv) 0 to 10% by weight of the additive.

As already mentioned above, the electrolyte can comprise not only a first conducting salt according to formula (I) and a second conducting salt, but also a plurality of first conducting salts according to formula (I) and a plurality of second conducting salts. In the last-mentioned case, the aforementioned percentages also include a plurality of first conducting salts and a plurality of second conducting salts. The molar concentration of the first conducting salt lies in the range from 0.01 mol/L to 10 mol/L, preferably from 0.05 mol/L to 10 mol/L, more preferably from 0.1 mol/L to 6 mol/L and most preferably from 0.2 mol/L to 3.5 mol/L, based on the total volume of the electrolyte.

A further advantageous development of the rechargeable battery cell according to this disclosure provides that the electrolyte comprises at least 0.1 mol SO$_2$, preferably at least 1 mol SO$_2$, more preferably at least 5 mol SO$_2$, more preferably at least 10 mol SO$_2$ and most preferably at least 20 mol SO$_2$ per mole of conducting salt. The electrolyte can also comprise very high molar proportions of SO$_2$, wherein the preferred upper limit value is 2600 mol SO$_2$ per mole of conducting salt and upper limits of 1500, 1000, 500 and 100 mol of SO$_2$ per mole of conducting salt are further preferred in this order. The term "per mole of conducting salt" refers to all conducting salts that are comprised in the electrolyte. Electrolytes based on SO$_2$ having such a concentration ratio between SO$_2$ and the conducting salt have the advantage in that they can dissolve a larger amount of conducting salt compared to the electrolytes known from the prior art, which are based, for example, on an organic solvent blend. In the context of this disclosure, it was found that, surprisingly, an electrolyte having a relatively low concentration of conducting salt is advantageous despite the associated higher vapor pressure, in particular with regard to its stability over many charge and discharge cycles of the rechargeable battery cell. The concentration of SO$_2$ in the electrolyte affects its conductivity. Thus, by choosing the SO$_2$ concentration, the conductivity of the electrolyte can be adjusted to the planned use of a rechargeable battery cell operated using this electrolyte.

The total content of SO$_2$ and the first conducting salt can be greater than 50 percent by weight (% by weight) of the weight of the electrolyte, preferably greater than 60% by weight, more preferably greater than 70% by weight, more preferably greater than 80% by weight, more preferably greater than 85% by weight, more preferably greater than 90% by weight, more preferably greater than 95% by weight or most preferably greater than 99% by weight.

The electrolyte can comprise at least 5% by weight SO$_2$ based on the total amount of the electrolyte comprised in the rechargeable battery cell, wherein values of 20% by weight SO$_2$, 40% by weight SO$_2$ and 60% by weight SO$_2$ are more preferred. The electrolyte can also comprise up to 95% by weight SO$_2$, wherein maximum values of 80% by weight SO$_2$ and 90% by weight SO$_2$ are preferred in this order.

It is within the scope of this disclosure for the electrolyte to preferably have only a small percentage or even no percentage of at least one organic solvent. The proportion of organic solvents in the electrolyte, which is present, for example, in the form of one solvent or a blend of a plurality of solvents, can preferably be at most 50% by weight of the weight of the electrolyte. Lower proportions of at most 40% by weight, at most 30% by weight, at most 20% by weight, at most 15% by weight, at most 10% by weight, at most 5% by weight or at most 1% by weight of the electrolyte weight are particularly preferred. More preferably, the electrolyte is free of organic solvents. Due to the low proportion of organic solvents or even their complete absence, the electrolyte is either hardly combustible or not at all combustible. This increases the operational safety of a rechargeable battery cell operated using such an SO$_2$-based electrolyte. The SO$_2$-based electrolyte is particularly preferably essentially free of organic solvents.

In relation to the total weight of the electrolyte composition, the electrolyte has the following composition in a further advantageous development of the rechargeable battery cell:
(i) 5 to 99.4% by weight sulfur dioxide,
(ii) 0.6 to 95% by weight of the first conducting salt,
(iii) 0 to 25% by weight of the second conducting salt,
(iv) 0 to 10% by weight of the additive and
(v) 0 to 50% by weight of an organic solvent.

Active Metal

Advantageous developments of the rechargeable battery cell according to this disclosure with regard to the active metal are described below.

In a first advantageous development of the rechargeable battery cell, the active metal is:
an alkali metal, in particular lithium or sodium;
an alkaline earth metal, in particular calcium;
a metal from group 12 of the periodic table, in particular zinc; or
aluminum.

Negative Electrode

Advantageous developments of the rechargeable battery cell according to this disclosure with regard to the negative electrode are described below.

A further advantageous development of the battery cell according to this disclosure provides that the negative electrode is an insertion element. Said insertion electrode comprises an insertion material as the active material, in which the ions of the active metal can be stored during the charging of the rechargeable battery cell and from which the ions of the active metal can be removed during the discharging of the rechargeable battery cell. This means that the electrode processes can take place not only on the surface of the electrode, but also in the interior of the negative electrode. If, for example, a conducting salt based on lithium is used, then lithium ions can be stored in the insertion material while the rechargeable battery cell is being charged and can be removed therefrom while the rechargeable battery cell is being discharged. The negative electrode preferably comprises carbon as an active material or insertion material, in particular carbon in the allotrope graphite. However, it is also within the scope of this disclosure for the carbon to be present in the form of natural graphite (flake conveyor or rounded), synthetic graphite (mesophase graphite), graphitized mesocarbon microbeads (MCMB), with carbon-coated graphite or amorphous carbon.

In a further advantageous development of the rechargeable battery cell according to this disclosure, the negative electrode comprises lithium intercalation anode active materials that do not comprise carbon, such as lithium titanates (for example, $Li_4Ti_5O_{12}$).

A further advantageous development of the rechargeable battery cell according to this disclosure provides that the negative electrode comprises anode active materials which form an alloy with lithium. These are, for example, lithium-storing metals and metal alloys (for example, Si, Ge, Sn, $SnCo_xC_y$, $SnSi_x$ and the like) and oxides of lithium-storing metals and metal alloys (for example, $SnO_x$, $SiO_x$, oxidic glasses of Sn, Si and the like).

In a further advantageous development of the rechargeable battery cell according to this disclosure, the negative electrode comprises conversion anode active materials. Said conversion anode active materials can be, for example, transition metal oxides in the form of manganese oxides ($MnO_x$), iron oxides ($FeO_x$), cobalt oxides ($CoO_x$), nickel oxides ($NiO_x$), copper oxides ($CuO_x$) or metal hydrides in the form of magnesium hydride ($MgH_2$), titanium hydride ($TiH_2$), aluminum hydride ($AlH_3$) and boron, aluminum and magnesium based ternary hydrides and the like.

In a further advantageous development of the rechargeable battery cell according to this disclosure, the negative electrode comprises a metal, in particular metallic lithium.

A further advantageous development of the rechargeable battery cell according to this disclosure provides that the negative electrode is porous, wherein the porosity is preferably at most 50%, more preferably at most 45%, more preferably at most 40%, more preferably at most 35%, more preferably at most 30%, more preferably at most 20% and most preferably at most 10%. The porosity represents the cavity volume in relation to the total volume of the negative electrode, wherein the cavity volume is formed by so-called pores or cavities. This porosity leads to an increase in the inner surface area of the negative electrode. Furthermore, the porosity reduces the density of the negative electrode and thus also its weight. The individual pores of the negative electrode can preferably be completely filled with the electrolyte during operation.

A further advantageous development of the battery cell according to this disclosure provides that the negative electrode has a discharge element. This means that in addition to the active material or insertion material, the negative electrode also comprises a discharge element. This discharge element serves to enable the required electronically conductive connection of the active material of the negative electrode. For this purpose, the discharge element is in contact with the active material involved in the electrode reaction of the negative electrode. Said discharge element can be designed in a planar manner in the form of a thin metal sheet or a thin metal foil. The thin metal foil preferably has a perforated or mesh-like structure. The planar discharge element can also consist of a plastic film coated with metal. Said metal coatings have a thickness in the range from 0.1 µm to 20 µm. The active material of the negative electrode is preferably applied to the surface of the thin metal sheet, the thin metal foil or the metal-coated plastic foil. The active material can be applied to the front and/or the rear side of the planar discharge element. Such planar discharge elements have a thickness in the range from 5 µm to 50 µm. A thickness of the planar discharge element in the range from 10 µm to 30 µm is preferred. When using planar discharge elements, the negative electrode can have a total thickness of at least 20 µm, preferably at least 40 µm and particularly preferably at least 60 µm. The maximum thickness is at most 200 µm, preferably at most 150 µm and particularly preferably at most 100 µm. The area-specific capacity of the negative electrode based on the coating on one side is preferably at least 0.5 mAh/cm$^2$ when using a planar discharge element, wherein the following values are further preferred in this order: 1 mAh/cm$^2$, 3 mAh/cm$^2$, 5 mAh/cm$^2$, 10 mAh/cm$^2$, 15 mAh/cm$^2$, 20 mAh/cm$^2$.

Furthermore, there is also the possibility for the discharge element to be designed three-dimensionally in the form of a porous metal structure, in particular in the form of a metal foam. The term "three-dimensional porous metal structure" refers to any structure consisting of metal that not only extends over the length and width of the flat electrode like the thin metal sheet or the metal foil, but also over its thickness dimension. The three-dimensional porous metal structure is sufficiently porous such that the active material of the negative electrode can be incorporated into the pores of the metal structure. The amount of active material incorporated or applied is the loading on the negative electrode. When the discharge element is designed three-dimensionally in the form of a porous metal structure, in particular in the form of a metal foam, then the negative electrode preferably has a thickness of at least 0.2 mm, more preferably at least 0.3 mm, more preferably at least 0.4 mm, more preferably at least 0.5 mm and most preferably at least 0.6 mm. In this case, the thickness of the electrodes is significantly greater compared to negative electrodes, which is the case with organic lithium-ion cells. A further advantageous embodiment provides that the area-specific capacity of the negative electrode when using a three-dimensional discharge element, in particular in the form of a metal foam, is preferably at least 2.5 mAh/cm$^2$, wherein the following values are further preferred in this order: 5 mAh/cm$^2$, 15 mAh/cm$^2$, 25 mAh/cm$^2$, 35 mAh/cm$^2$, 45 mAh/cm$^2$, 55 mAh/cm$^2$, 65 mAh/cm$^2$, 75 mAh/cm$^2$. When the discharge element is designed three-dimensionally in the form of a porous metal structure, in particular in the form of a metal foam, the amount of active material of the negative electrode, that is, the loading of the electrode, based on its area, is at least 10 mg/cm$^2$, preferably at least 20 mg/cm$^2$, more preferably at least 40 mg/cm$^2$, more preferably at least 60 mg/cm$^2$, more preferably at least 80 mg/cm$^2$ and most preferably at least 100 mg/cm$^2$. This loading of the negative electrode has a positive effect on the charging process and the discharging process of the rechargeable battery cell.

In a further advantageous development of the battery cell according to this disclosure, the negative electrode has at least one binder. Said binder is preferably a fluorinated binder, in particular a polyvinylidene fluoride and/or a terpolymer which is formed from tetrafluoroethylene, hexafluoropropylene and vinylidene fluoride. However, it can also be a binder which consists of a polymer which is composed of monomeric structural units of a conjugated carboxylic acid or of the alkali, alkaline earth or ammonium salt of this conjugated carboxylic acid or of a combination thereof. Furthermore, the binder can also consist of a polymer based on monomeric styrene and butadiene structural units. In addition, the binder can also be a binder from the group of carboxymethyl celluloses. The binder is present in the negative electrode, preferably in a concentration of at most 20% by weight, more preferably at most 15% by weight, more preferably at most 10% by weight, more preferably at most 7% by weight, more preferably at most 5% by weight and most preferably at most 2% by weight based on the total weight of the negative electrode.

In a further advantageous development of the battery cell according to this disclosure, the negative electrode has at least one conductivity additive. The conductivity additive should preferably have a low weight, high chemical resistance and a high specific surface area, examples of conductivity additives are particulate carbon (carbon black, Super P, acetylen black), fibrous carbon (carbon nanotubes CNT, carbon (nano) fibers), finely divided graphites and graphene (nanosheets).

Structure of the Rechargeable Battery Cell

Advantageous developments of the rechargeable battery cell according to this disclosure are described below with regard to their structure.

In order to further improve the function of the rechargeable battery cell, a further advantageous development of the rechargeable battery cell according to this disclosure provides that the rechargeable battery cell comprises a plurality of negative electrodes and a plurality of positive electrodes, which are stacked alternately in the housing. Here, the positive electrodes and the negative electrodes are preferably each electrically separated from one another by separators.

The separator can be formed from a non-woven material, a membrane, a woven material, a knitted material, an organic material, an inorganic material or a combination thereof. Organic separators can consist of unsubstituted polyolefins (for example, polypropylene or polyethylene), partially to completely halogen-substituted polyolefins (for example, partially to completely fluorine-substituted, in particular PVDF, ETFE, PTFE), polyesters, polyamides or polysulfones. Separators that comprise a combination of organic and inorganic materials are, for example, glass fiber textile materials in which the glass fibers are provided with a suitable polymer coating. The coating preferably comprises a fluorine-containing polymer such as polytetrafluoroethylene (PTFE), ethylene-tetrafluoroethylene (ETFE), perfluoroethylene propylene (FEP), THV (terpolymer of tetrafluoroethylene, hexafluoroethylene and vinylidene fluoride), a perfluoroalkoxy polymer (PFA), aminosilane, polypropylene or polyethylene (PE). The separator can also be folded in the housing of the rechargeable battery cell, for example, in the form of so-called "Z-folding." In this Z-folding, a strip-shaped separator is folded in a Z-like manner through or around the electrodes. Furthermore, the separator can also be formed as separator paper.

It is also within the scope of this disclosure for the separator to be able to be designed as a sheath, wherein each positive electrode or each negative electrode is enveloped by the sheath. The sheath can be formed from a non-woven material, a membrane, a woven material, a knitted material, an organic material, an inorganic material or a combination thereof.

A sheath on the positive electrode leads to more uniform ion migration and ion distribution in the rechargeable battery cell. The more even the ion distribution, in particular in the negative electrode, the higher the possible loading of the negative electrode with active material and, as a result, the usable capacity of the rechargeable battery cell. At the same time, risks are avoided that could be associated with uneven loading and the resulting deposition of the active metal. These advantages are particularly effective when the positive electrodes of the rechargeable battery cell are enveloped in the sheath.

The surface dimensions of the electrodes and the sheath can preferably be matched to one another such that the external dimensions of the sheath of the electrodes and the external dimensions of the unsheathed electrodes match at least in one dimension.

The surface area of the sheath can preferably be greater than the surface area of the electrode. In this case, the sheath extends beyond a boundary of the electrode. Two layers of the sheath covering the electrode on both sides can therefore be connected to one another at the edge of the positive electrode by an edge connection.

In a further advantageous embodiment of the rechargeable battery cell according to this disclosure, the negative electrodes have a sheath, while the positive electrodes have no sheath.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
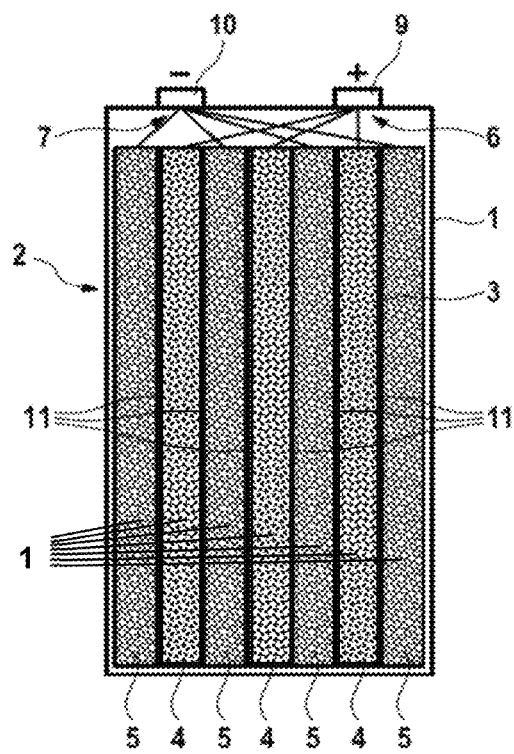
FIG. 1 shows a first embodiment of a rechargeable battery cell according to this disclosure in a cross-sectional illustration.

FIG. 1 shows a first embodiment of a rechargeable battery cell 2 according to this disclosure in a cross-sectional illustration. Said rechargeable battery cell 2 is designed as a prismatic cell and has a housing 1, among other things. Said housing 1 encloses an electrode array 3 which comprises three positive electrodes 4 and four negative electrodes 5. The positive electrodes 4 and the negative electrodes 5 are stacked alternately in the electrode array 3. The housing 1 can, however, also accommodate more positive electrodes 4 and/or negative electrodes 5. In general, it is preferred when the number of negative electrodes 5 is one greater than the number of positive electrodes 4. This has the consequence of the outer end faces of the electrode stack being formed by the electrode surfaces of the negative electrodes 5. The electrodes 4, 5 are connected to corresponding contacts 9, 10 of the rechargeable battery cell 2 via electrode connections 6, 7. The rechargeable battery cell 2 is filled with an $SO_2$-based electrolyte such that the electrolyte penetrates as completely as possible into all pores or cavities, in particular within the electrodes 4, 5. The electrolyte is not visible in FIG. 1. In the present embodiment, the positive electrodes 4 comprise an intercalation compound as an active material. This intercalation compound is $LiCoO_2$.

The electrodes 4, 5 are designed flat in the present embodiment, that is, as layers having a thickness that is smaller in relation to their surface area. They are each separated from one another by separators 11. The housing 1 of the rechargeable battery cell 2 is essentially designed as a rectangular parallelepiped, wherein the electrodes 4, 5 and the walls of the housing 1 shown in a sectional illustration extend perpendicular to the plane of the drawing and are essentially straight and flat. The rechargeable battery cell 2 can, however, also be designed as a winding cell in which the electrodes consist of thin layers that are wound up together with a separator material. The separators 11, on the one hand, separate the positive electrode 4 and the negative electrode 5 spatially and electrically and, on the other hand, are permeable to the ions of the active metal, among other things. In this way, large electrochemically effective surfaces are created, which enable a correspondingly high current yield.

The electrodes 4, 5 also have a discharge element which serves to enable the required electronically conductive connection of the active material of the respective electrode. Said discharge element is in contact with the active material involved in the electrode reaction of the respective electrode 4, 5 (not depicted in FIG. 1). The discharge element is designed in the form of a porous metal foam 18. The metal foam 18 extends over the thickness dimension of the electrodes 4, 5. The active material of the positive electrodes 4 and the negative electrodes 5 is incorporated into the pores of said metal foam 18, such that it fills the pores of the metal foam evenly over the entire thickness of the metal structure. The positive electrodes 4 comprise a binder to improve the mechanical strength. This binder is a fluoropolymer. The negative electrodes 5 comprise carbon as an active material in a form suitable as an insertion material for the absorption of lithium ions. The structure of the negative electrode 5 is similar to that of the positive electrode 4.

Figure 2:
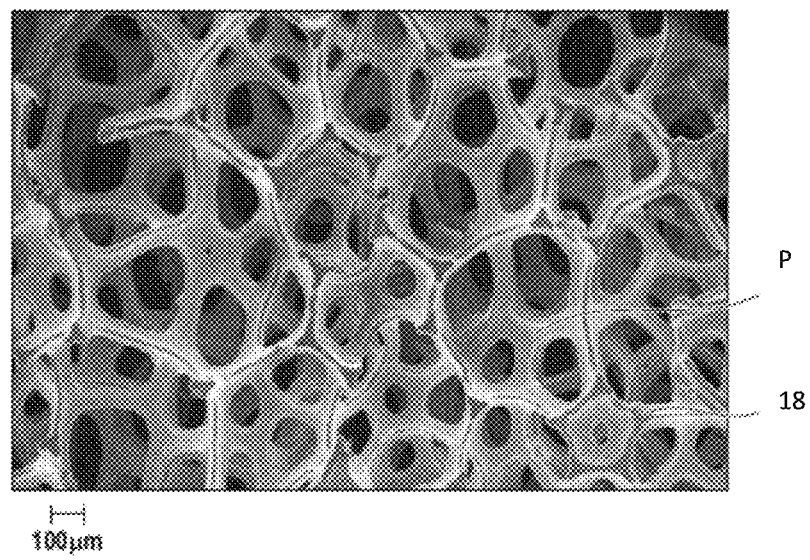
FIG. 2 shows an electron microscope image of the three-dimensional porous structure of the metal foam of the first embodiment from FIG. 1 as a detailed illustration.

FIG. 2 shows an electron microscope image of the three-dimensional porous structure of the metal foam 18 of the first embodiment from FIG. 1. On the basis of the specified scale, it can be seen that the pores P have an average diameter of more than 100 μm, that is, are relatively large. This metal foam is a metal foam made of nickel.

Figure 3:
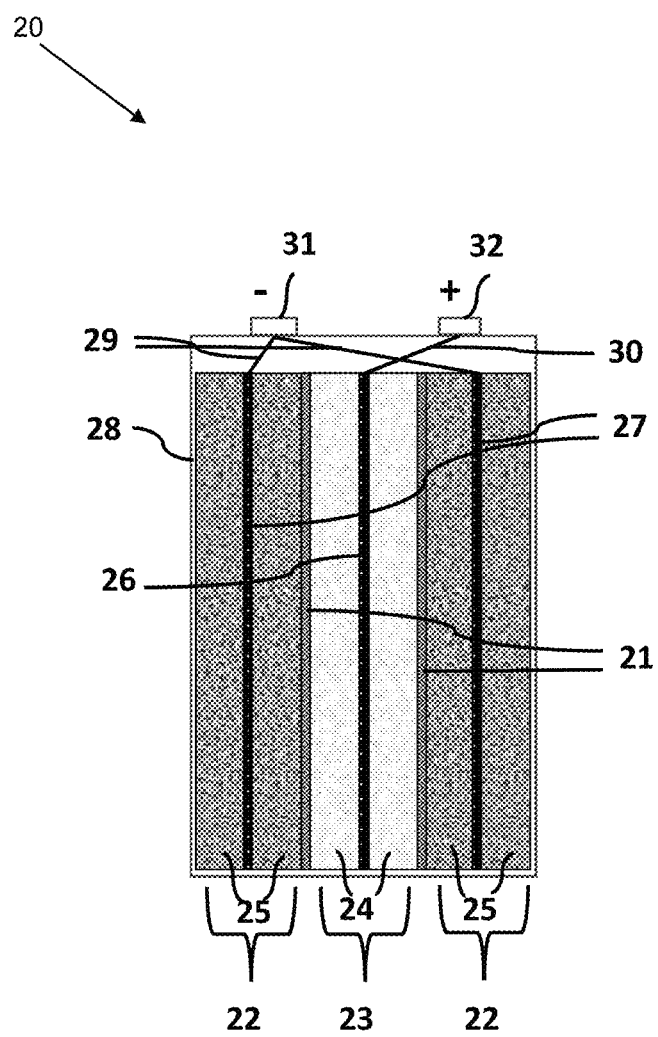
FIG. 3 shows a second embodiment of a rechargeable battery cell according to this disclosure in a cross-sectional illustration.

FIG. 3 shows a second embodiment of a rechargeable battery cell 20 according to this disclosure in a cross-sectional illustration. Said second embodiment differs from the first embodiment shown in FIG. 1 in that the electrode array comprises a positive electrode 23 and two negative electrodes 22. They are each separated from one another by separators 21 and surrounded by a housing 28. The positive electrode 23 has a discharge element 26 in the form of a planar metal foil, to which the active material 24 of the positive electrode 23 is applied on both sides. The negative electrodes 22 also comprise a discharge element 27 in the form of a planar metal foil, to which the active material 25 of the negative electrode 22 is applied on both sides. Alternatively, the planar discharge elements of the edge electrodes, that is, of the electrodes that close off the electrode stack, can only be coated with active material on one side. The non-coated side faces the wall of the housing 28. The electrodes 22, 23 are connected to corresponding contacts 31, 32 of the rechargeable battery cell 20 via electrode connections 29, 30.

Figure 4:
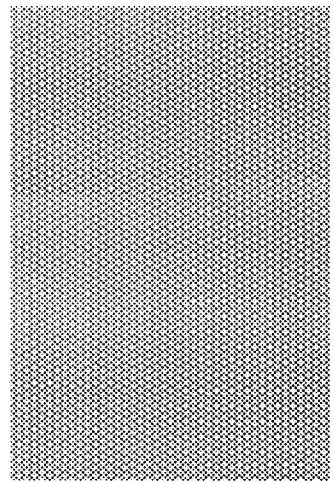
FIG. 4 shows a detail of the second embodiment from FIG. 3.

FIG. 4 shows the planar metal foil which serves as a discharge element 26, 27 for the positive electrodes 23 and the negative electrodes 22 in the second embodiment from FIG. 3. This metal foil has a perforated or mesh-like structure having a thickness of 20 μm.

Figure 5:
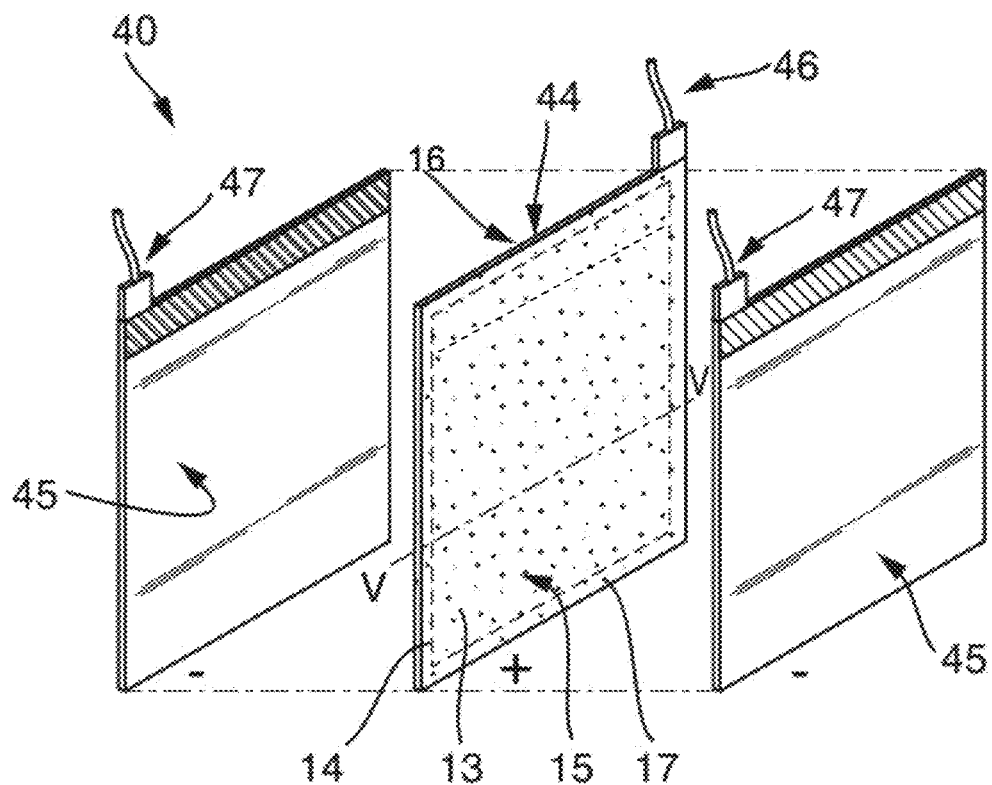
FIG. 5 shows a third embodiment of the rechargeable battery cell according to this disclosure in an exploded illustration.

FIG. 5 shows a third embodiment of a rechargeable battery cell 40 according to this disclosure in an exploded illustration. This third embodiment differs from the two embodiments explained above in that the positive electrode 44 is enveloped by a sheath 13. In this case, a surface area of the sheath 13 is greater than a surface area of the positive electrode 44, the boundary 14 of which is shown in FIG. 5 as a dashed line. Two layers 15, 16 of the sheath 13 that cover the positive electrode 44 on both sides are connected to one another at the circumferential edge of the positive electrode 44 by an edge connection 17. The two negative electrodes 45 are not enveloped. The electrodes 44 and 45 can be contacted via the electrode connections 46 and 47.

Example 1: Preparation of a Reference Electrolyte

A reference electrolyte used for the examples described below was prepared by the method described in patent specification EP 2 954 588 B1. First, lithium chloride (LiCl) was dried under vacuum at 120° C. for three days (hereinafter referred to as [V4]). Aluminum particles (Al) were dried under vacuum for two days at 450° C. LiCl, aluminum chloride ($AlCl_3$) and Al were mixed together in an $AlCl_3$:LiCl:Al molar ratio of 1:1.06:0.35 in a glass bottle having an opening to allow gas to escape. This blend was thereafter heat-treated in stages to produce a molten salt. After cooling, the salt melt formed was filtered, then cooled to room temperature and finally $SO_2$ was added until the desired molar ratio of $SO_2$ to $LiAlCl_4$ was formed. The reference electrolyte thus formed had the composition $LiAlCl_4 * x\ SO_2$, wherein x is dependent on the amount of $SO_2$ supplied.

Example 2: Preparation of Four Embodiments 1, 2, 3 and 4 of an $SO_2$-Based Electrolyte for a Battery Cell Four embodiments 1, 2, 3 and 4 of the $SO_2$-based electrolyte were prepared for the experiments described below (hereinafter referred to as electrolytes 1, 2, 3 and 4). For this purpose, four different first conducting salts according to formula (I) were initially prepared using a manufacturing process described in the following documents [V5], [V6] and [V7]:

[V5] "I. Krossing, *Chem. Eur. J.* 2001, 7, 490;

[V6] S. M. Ivanova et al., *Chem. Eur. J.* 2001, 7, 503;

[V7] Tsujioka et al., *J. Electrochem. Soc.*, 2004, 151, A1418"

These four different, first conducting salts according to formula (I) are referred to below as compounds 1, 2, 3 and 4. They come from the family of polyfluoroalkoxyaluminates and were prepared in hexane according to the following reaction equation, starting from $LiAlH_4$ and the corresponding alcohol R—OH with $R^1=R^2=R^3=R^4$.

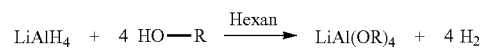

As a result, compounds 1, 2, 3 and 4 shown below were formed using the sum and structural formulas:

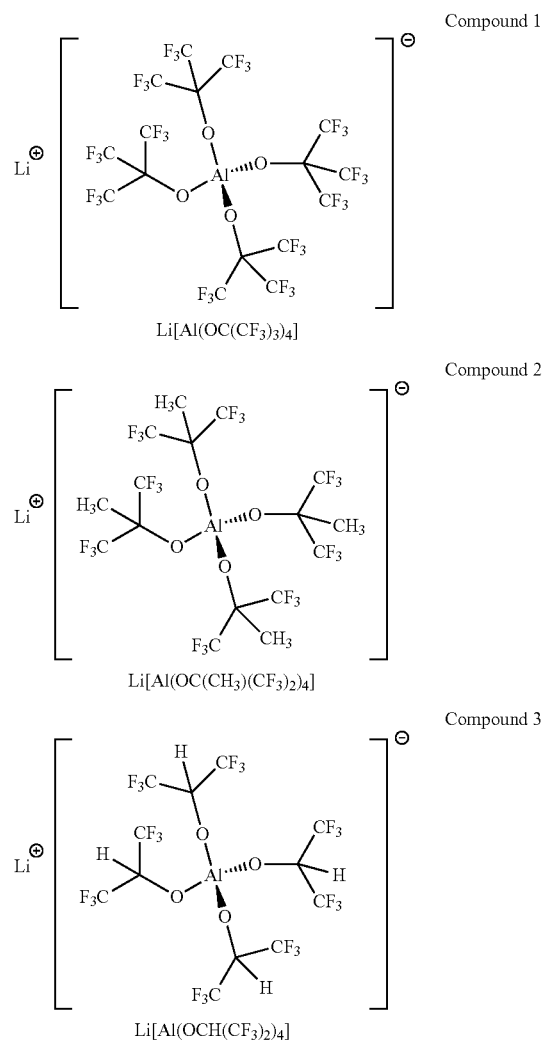

-continued

Compound 4

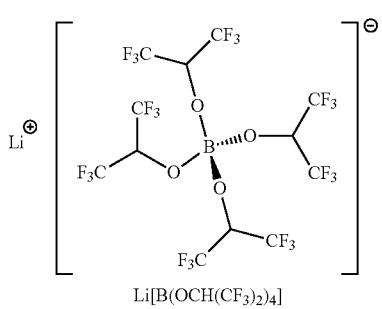

Li[B(OCH(CF$_3$)$_2$)$_4$]

Compounds 1, 2, 3 and 4 were first recrystallized for purification. As a result, residues of the educt LiAlH$_4$ were removed from the first conducting salt, since said educt could possibly lead to the formation of sparks with possibly existing traces of water in SO$_2$.

Compounds 1, 2, 3 and 4 were then dissolved in SO$_2$. It was found that compounds 1, 2, 3 and 4 dissolve well in SO$_2$.

The preparation of electrolytes 1, 2, 3 and 4 was performed at low temperature or under pressure according to process steps 1 to 4 listed below:
1) receiving of the respective compound 1, 2, 3 and 4 in a pressure piston each with a riser pipe,
2) evacuation of the pressure pistons,
3) inflow of liquid SO$_2$ and
4) repetition of steps 2+3 until the target amount of SO$_2$ was added.

The respective concentration of compounds 1, 2, 3 and 4 in electrolytes 1, 2, 3 and 4 was 0.6 mol/L (molar concentration based on 1 liter of the electrolyte), unless otherwise described in the description of the experiment. The experiments described below were performed using electrolytes 1, 2, 3 and 4 and the reference electrolyte.

Example 3: Production of Test Full Cells

The test full cells used in the experiments described below are rechargeable battery cells having two negative electrodes and one positive electrode, each separated by a separator. The positive electrodes included an active material, a conductivity mediator and a binder. The negative electrodes comprised graphite as the active material and also a binder. As mentioned in the experiment, the negative electrodes can also comprise a conductivity additive. The active material of the positive electrode is named in the respective experiment. The discharge element of the positive and negative electrodes was made of nickel. Among other things, the aim of the investigations is to confirm the use of various active materials for the positive electrode in a battery cell according to this disclosure in combination with the electrolyte according to this disclosure. Table 3 shows which active materials were investigated for the positive electrode and which upper potentials were used.

TABLE 3

Active Materials Examined

| Experiment | Active Material | Upper Potential |
|---|---|---|
| 1 | Lithium nickel manganese cobalt oxide (NMC) of the composition LiNi$_{0.6}$Mn$_{0.2}$Co$_{0.2}$O$_2$ (NMC622) and LiNi$_{0.8}$Mn$_{0.1}$Co$_{0.1}$O$_2$ (NMC811) | 4.4 V 4.6 V 5.0 V |

TABLE 3-continued

Active Materials Examined

| Experiment | Active Material | Upper Potential |
|---|---|---|
| 2 | Lithium cobalt oxide LiCoO$_2$ (LCO) | 4.4 V |
| 3 | Lithium nickel manganese cobalt oxide (NMC) of the composition LiNi$_{0.6}$Mn$_{0.2}$Co$_{0.2}$O$_2$ (NMC622) | 4.4 V |
| 4 | Lithium-manganese-rich metal oxide of the composition Li$_{1.16}$Mn$_{0.61}$Ni$_{0.15}$Co$_{0.16}$O$_2$ | 4.8 V |

The test full cells were each filled with the electrolyte required for the experiments, that is, either with the reference electrolyte or electrolytes 1, 2, 3 or 4.

Several, that is, two to four, identical test whole cells were produced for each experiment. The results presented in the experiments are each mean values from the measured values obtained for the identical test full cells.

Example 4: Measurement in Test Full Cells

For measurements in test full cells, for example, the discharge capacity is determined from the number of cycles. For this purpose, the test full cells are charged with a certain charge current intensity up to a certain upper potential. The corresponding upper potential is held until the charge current has dropped to a certain value. The discharge then takes place with a certain discharge current intensity up to a certain discharge potential. This charging method is a so-called I/U charging. This process is repeated depending on the desired number of cycles. The upper potentials or the discharge potential and the respective charge or discharge current intensities are given in the experiments. The value to which the charge current must have dropped is also described in the experiments.

The term "upper potential" is used as a synonym for the terms "charge potential," "charge voltage," "end-of-charge voltage" and "upper potential limit." The terms denote the voltage/potential up to which a cell or battery is charged with the aid of a battery charger.

The battery is preferably charged at a current rate of C/2 and at a temperature of 22° C. With a charge or discharge rate of 1 C, by definition, the nominal capacity of a test full cell is charged or discharged in one hour. A charge rate of C/2 means a charge time of 2 hours.

The term "discharge potential" is used synonymously with the term "lower cell voltage." This describes the voltage/potential up to which a cell or battery is discharged with the aid of a battery charger.

The battery is preferably discharged at a current rate of C/2 and at a temperature of 22° C.

The discharge capacity is obtained from the discharge current and the time until the criteria for ending the discharge are fulfilled. The associated figures show mean values for the discharge capacities as a function of the number of cycles. These mean values of the discharge capacities are expressed as a percentage of the nominal capacity, often standardized to the maximum capacity that was achieved in the respective test. The nominal capacity is obtained by subtracting from the theoretical capacity of the positive electrode that capacity that is consumed in the first cycle for the formation of a coating layer on the negative electrode. This coating layer is formed on the negative electrode when the test full cell is charged for the first time. Lithium ions are irreversibly consumed for this formation of a coating layer, so that the respective test full cell has less cyclic capacity available for the subsequent cycles.

Experiment 1: Test Full Cells Having Lithium Nickel Manganese Cobalt Oxide (NMC) of the Composition $LiNi_{0.6}Mn_{0.2}Co_{0.2}O_2$ (NMC622) and $LiNi_{0.8}Mn_{0.1}Co_{0.1}O_2$ (NMC811) as Active Electrode Materials An experiment was performed in test full cells according to Example 3 using positive electrodes made of lithium nickel manganese cobalt oxide of the composition $LiNi_{0.6}Mn_{0.2}Co_{0.2}O_2$ (NMC622) and $LiNi_{0.8}Mn_{0.1}Co_{0.1}O_2$ (NMC811) as active electrode materials. Compounds of the composition NMC can be charged in a battery cell having a suitable electrolyte up to high upper potentials and then discharged again. The test full cells were filled with electrolyte 1 described in Example 2. Three test full cells comprised positive electrodes having the compound NMC622, and in one test full cell, NMC811 was used as the active high-voltage cathode material.

To determine the discharge capacities (see Example 4), the test full cells were charged with a current intensity of 50 mA up to different upper potentials. The corresponding upper potential was held until the charge current had dropped to 40 mA. The discharge then took place with a current intensity of 50 mA up to a discharge potential of 2.5 volts. The upper potentials for the three NMC622 test full cells were 4.4 volts, 4.6 volts and 5.0 volts. The upper potential of the NMC811 test full cell was 4.6 volts.

Figure 6:
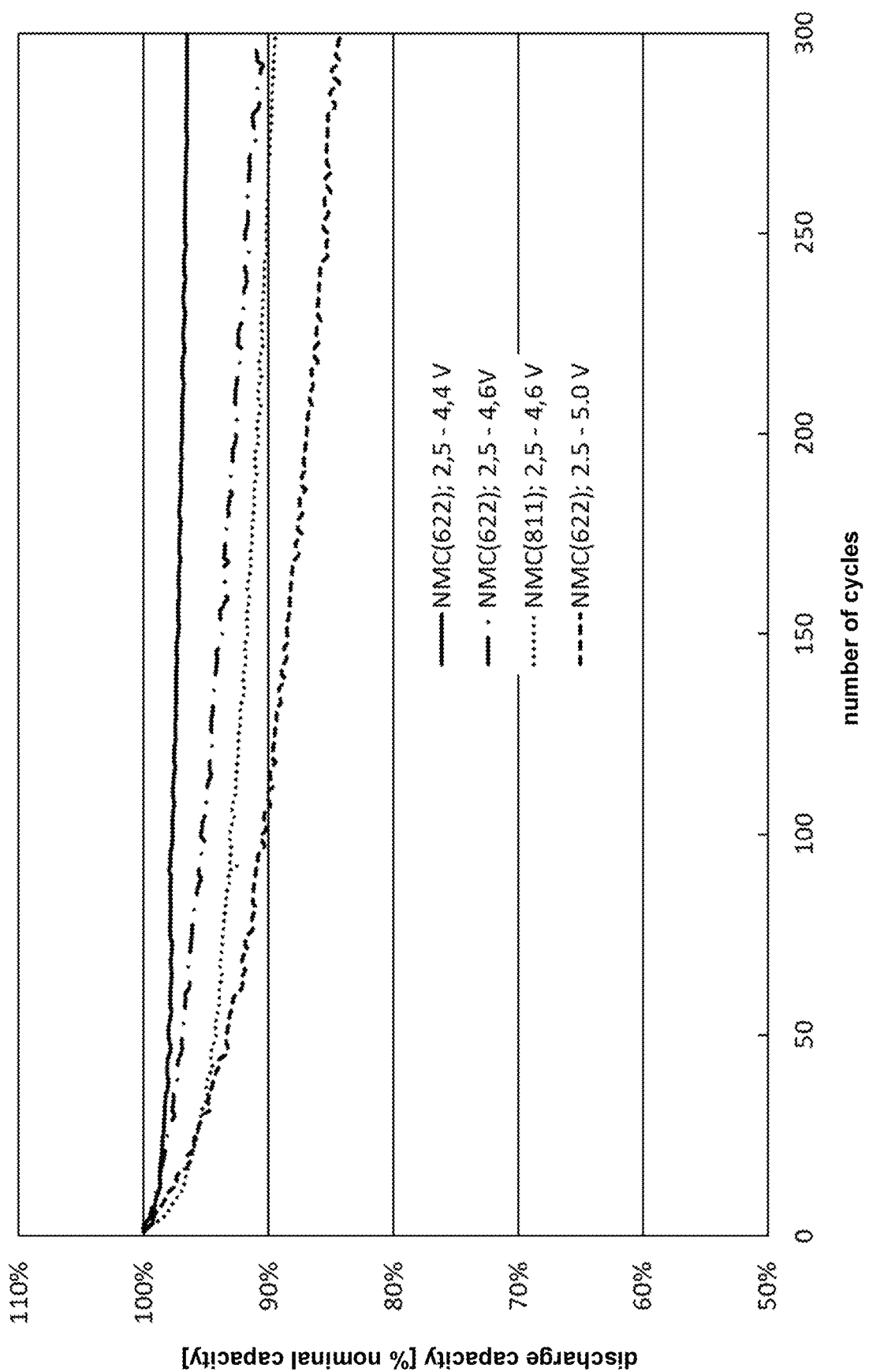
FIG. 6 shows the discharge capacity as a function of the number of cycles of test full cells, which comprise lithium nickel manganese cobalt oxide (NMC) of the composition $LiNi_{0.6}Mn_{0.2}Co_{0.2}O_2$ (NMC622) and $LiNi_{0.8}Mn_{0.1}Co_{0.1}O_2$ (NMC811) as the active material of the positive electrode.

FIG. 6 shows mean values for the discharge capacities of the four test full cells as a function of the number of cycles. These mean values of the discharge capacities are respectively expressed as a percentage of the nominal capacity [% nominal capacity]. The profile of the discharge capacities of the four test full cells shows a uniform, slightly decreasing profile. The decrease in capacity is somewhat greater in those test full cells which were cycled at a higher upper potential. Similar experiments using organic lithium-ion cells were performed in the above-mentioned publication [V1] from the prior art using NMC cathodes and the organic electrolyte LP57, which has the composition 1 M $LiPF_6$ in EC:EMC 3:7. Table 4 compares the results of Experiment 1 with those of the experiment from [V1].

The outstanding properties of the battery cells according to this disclosure become clear when compared to the prior art. The cathode material NMC (622) in battery cells from the prior art shows, in the 300th cycle, only a discharge capacity of 94% at an upper potential of 4.4 volts and only a discharge capacity of 39% at an upper potential of 4.6 volts. In comparison, a cell according to this disclosure having NMC (622) cathode material shows, in the 300th cycle, a discharge capacity of 97% at 4.4 volts, a discharge capacity of 91% at 4.6 volts and even a value of 84% at a very high upper potential of 5.0 volts.

The cathode material NMC (811) shows a discharge capacity of 66% in the 300th cycle at an upper potential of 4.4 volts in the measurements from the prior art. The same material still shows a high discharge capacity of 90% in a battery cell according to this disclosure at an upper potential of 4.6 volts.

TABLE 4

Comparison of the Results of Experiment 1 with the Prior Art from Document [V1]

| | Upper Potential: | | | | | |
|---|---|---|---|---|---|---|
| | 4.4 V Discharge Capacity [%] Cycle 300 | | 4.6 V Discharge Capacity [%] Cycle 300 | | 5.0 V Discharge Capacity [%] Cycle 300 | |
| Cathode Material: | Prior Art (Organic Electrolyte; 1M $LiPF_6$ in EC: EMC 3:7) | Invention Experiment 1 | Prior Art (Organic Electrolyte; 1M $LiPF_6$ in EC: EMC 3:7) | Invention Experiment 1 | Prior Art (Organic Electrolyte; 1M $LiPF_6$ in EC: EMC 3:7) | Invention Experiment 1 |
| NMC (622) | 94% | 97% | 39% | 91% | — | 84% |
| NMC (811) | 66% | — | — | 90% | — | — |

Experiment 2: Test Full Cells Having Lithium Cobalt Oxide $LiCoO_2$ (LCO) as the Active Electrode Material In a further experiment, two test whole cells were produced according to Example 3. The active material of the positive electrodes (cathodes) consisted of lithium cobalt oxide (LCO).

A first test full cell was filled with a reference electrolyte according to Example 1 for this Experiment 2. The electrolyte had the composition $LiAlCl_4*6\ SO_2$. The two test full cells were filled with electrolyte 1 described in Example 2. The test full cells were cycled as described in Experiment 1 to determine the discharge capacities (see Example 4). The upper potential of the battery cells having reference electrolyte was 4.2 volts, that of the cells according to this disclosure was 4.4 volts.

Figure 7:
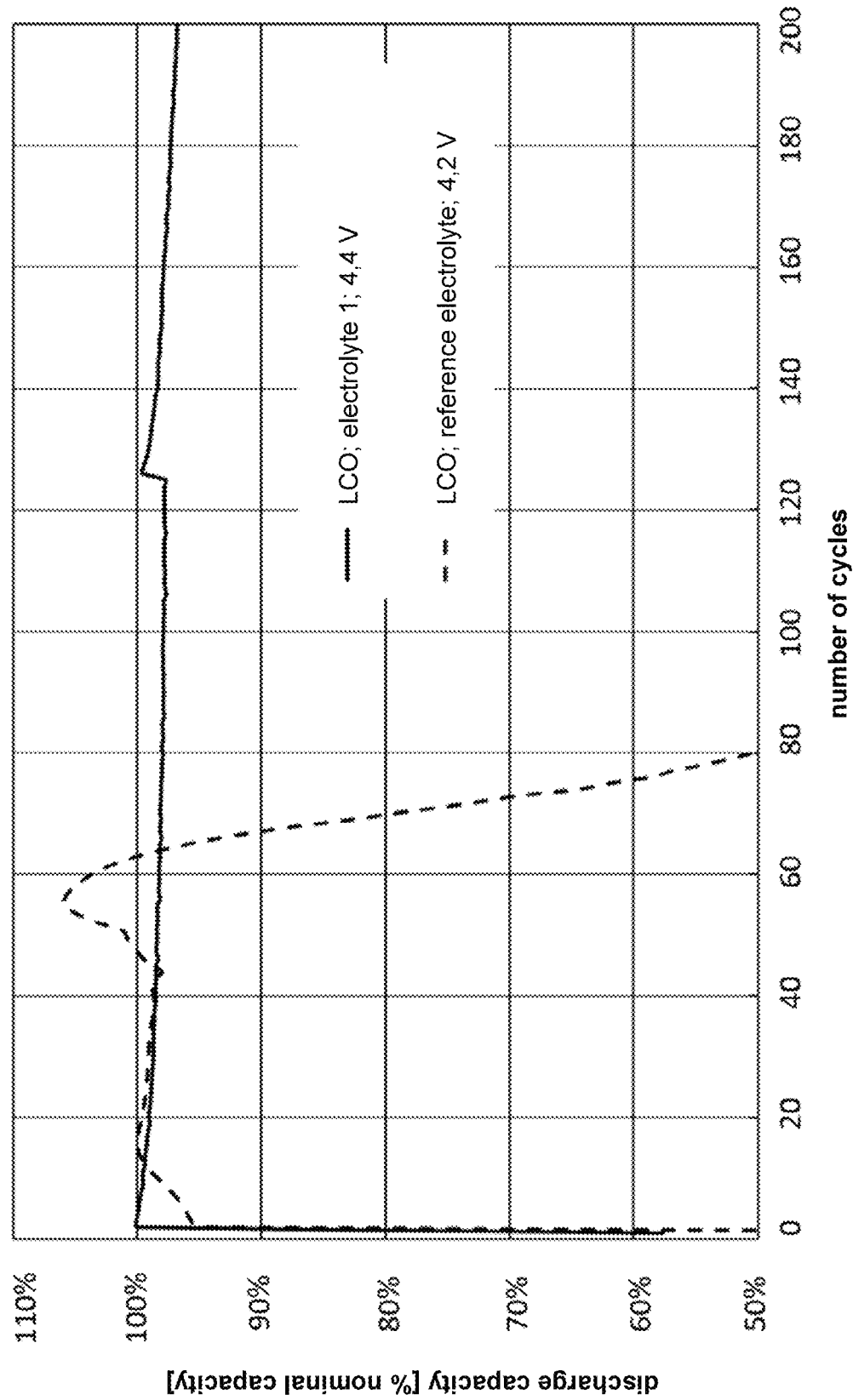
FIG. 7 shows the discharge capacity as a function of the number of cycles of test full cells that comprise lithium cobalt oxide $LiCoO_2$ (LCO) as the active material of the positive electrode, wherein a reference test full cell is filled with the reference electrolyte and a test full cell is filled with electrolyte 1 from Example 2.

FIG. 7 shows mean values for the discharge capacities of the two test full cells as a function of the number of cycles. These mean values of the discharge capacities are respectively expressed as a percentage of the nominal capacity [% nominal capacity]. The profile of the discharge capacities of the two test full cells shows completely different behavior.

The discharge capacity of the test full cell having reference electrolyte begins to rise at the 45th cycle and then falls steeply down at the 55th cycle until a capacity of only 50% is reached at cycle 80. Said test full cell is irreversibly damaged. A battery cell that comprises a combination of an electrode having lithium cobalt oxide as the active material and the reference electrolyte is not stable at an upper potential of 4.2 volts.

The cell according to this disclosure shows very stable behavior of the discharge capacity. A capacity of 97% is still obtained at cycle 200. A break had to be made in the measurement between cycle 125 and 126 due to device maintenance. The capacity after the break was increased by 2%, which is why the profile of the discharge capacity exhibits a local maximum at this point.

Experiment 3: Test Full Cells Having Lithium Nickel Manganese Cobalt Oxide (NMC) of the Composition $LiNi_{0.6}Mn_{0.2}Co_{0.2}O_2$ (NMC622) as the Active Electrode Material Experiment 2 was repeated using lithium nickel manganese cobalt oxide (NMC) of the composition $LiNi_{0.6}Mn_{0.2}Co_{0.2}O_2$ (NMC622) as the active material of the positive electrodes (cathodes). Two test full cells were again produced according to Example 3.

A first test full cell was filled with a reference electrolyte according to Example 1. The electrolyte had the composition $LiAlCl_4 * 6\ SO_2$. The two test full cells were filled with electrolyte 1 described in Example 2. The test full cells were cycled as described in Experiment 1 to determine the discharge capacities (see Example 4). The upper potential of the first test full cell having reference electrolyte was 4.2 volts, that of the second test full cell was 4.4 volts.

Figure 8:
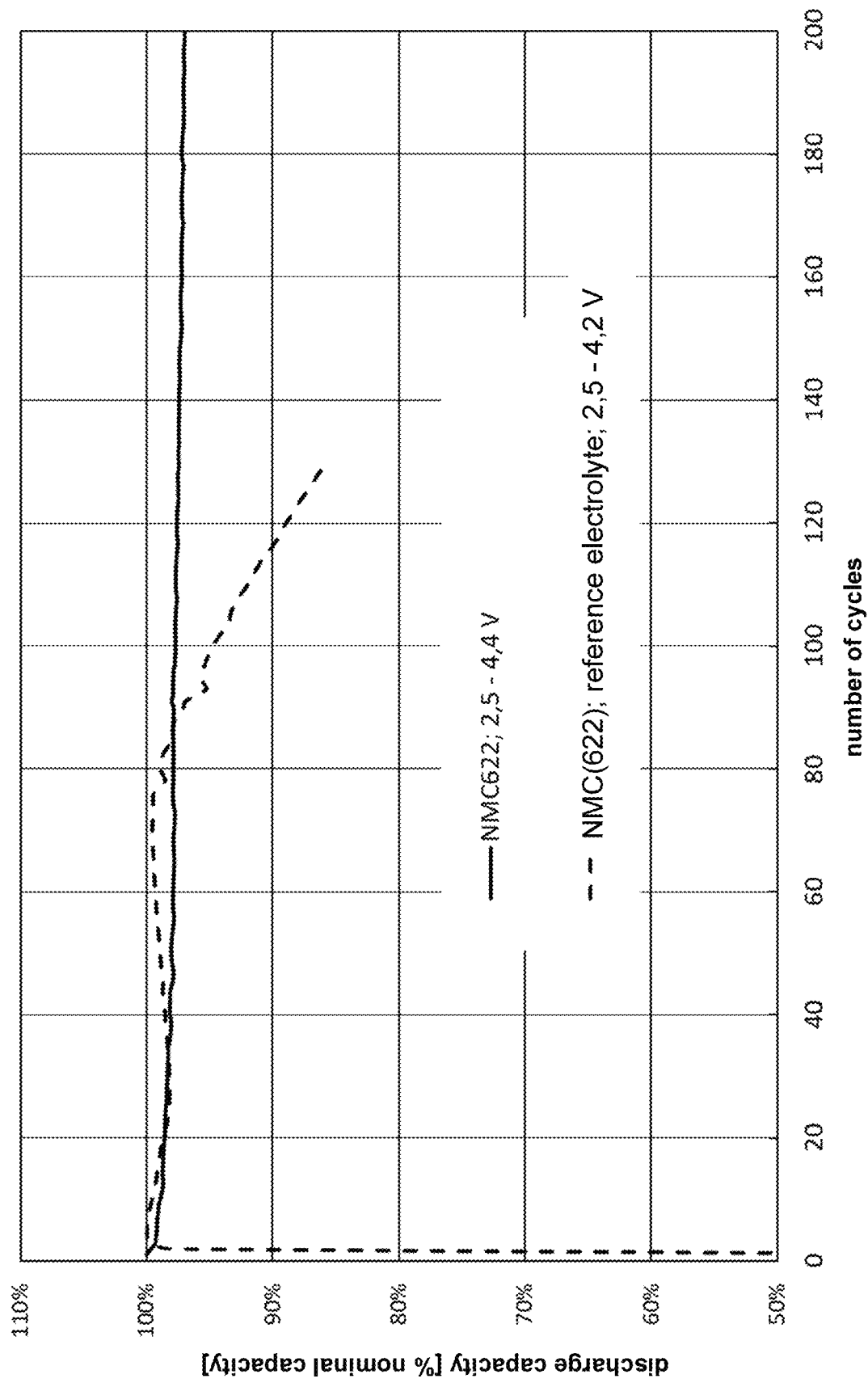
FIG. 8 shows the discharge capacity as a function of the number of cycles of test full cells comprising lithium nickel manganese cobalt oxide (NMC) of the composition $LiNi_{0.6}Mn_{0.2}Co_{0.2}O_2$ (NMC622) as the active material of the positive electrode, wherein a reference test full cell is filled with the reference electrolyte and a full test cell is filled with electrolyte 1 from Example 2.

FIG. 8 shows mean values for the discharge capacities of said two test full cells as a function of the number of cycles. These mean values of the discharge capacities are respectively expressed as a percentage of the nominal capacity [% nominal capacity]. Here, too, the profile of the discharge capacities of the two test full cells shows completely different behavior.

The discharge capacity of the first test full cell having reference electrolyte begins to steadily fall from the 75th cycle after previous fluctuations. A capacity of only 86% is reached at cycle 130. The first test full cell is irreversibly damaged. A battery cell that comprises a combination of an electrode having lithium nickel manganese cobalt oxide (NMC) of the composition $LiNi_{0.6}Mn_{0.2}Co_{0.2}O_2$ (NMC622) as the active material and the reference electrolyte is not stable at an upper potential of 4.2 volts.

The second test full cell shows very stable behavior of the discharge capacity. A capacity of 97% is still obtained at cycle 200.

Experiment 4: Test Full Cells Having a Metal Oxide of the Composition $Li_{1.16}Mn_{0.61}Ni_{0.15}Co_{0.16}O_2$ as the Active Material of the Positive Electrode In order to test a metal oxide that is rich in lithium and manganese as the active electrode material, a test full cell according to Example 3 was produced in a further experiment. The active material of the positive electrodes (cathodes) consisted of a metal oxide of the composition $Li_{1.16}Mn_{0.61}Ni_{0.15}Co_{0.16}O_2$, which is rich in lithium and manganese.

The test full cell was filled with electrolyte 1 described in Example 2. To determine the discharge capacities (see Example 4), the test full cell was charged with a current intensity of 100 mA up to an upper potential of 4.8 volts. The corresponding upper potential was held until the charge current had dropped to 40 mA. The discharge then took place with a current intensity of 100 mA up to a discharge potential of 2.0 volts.

Figure 9:
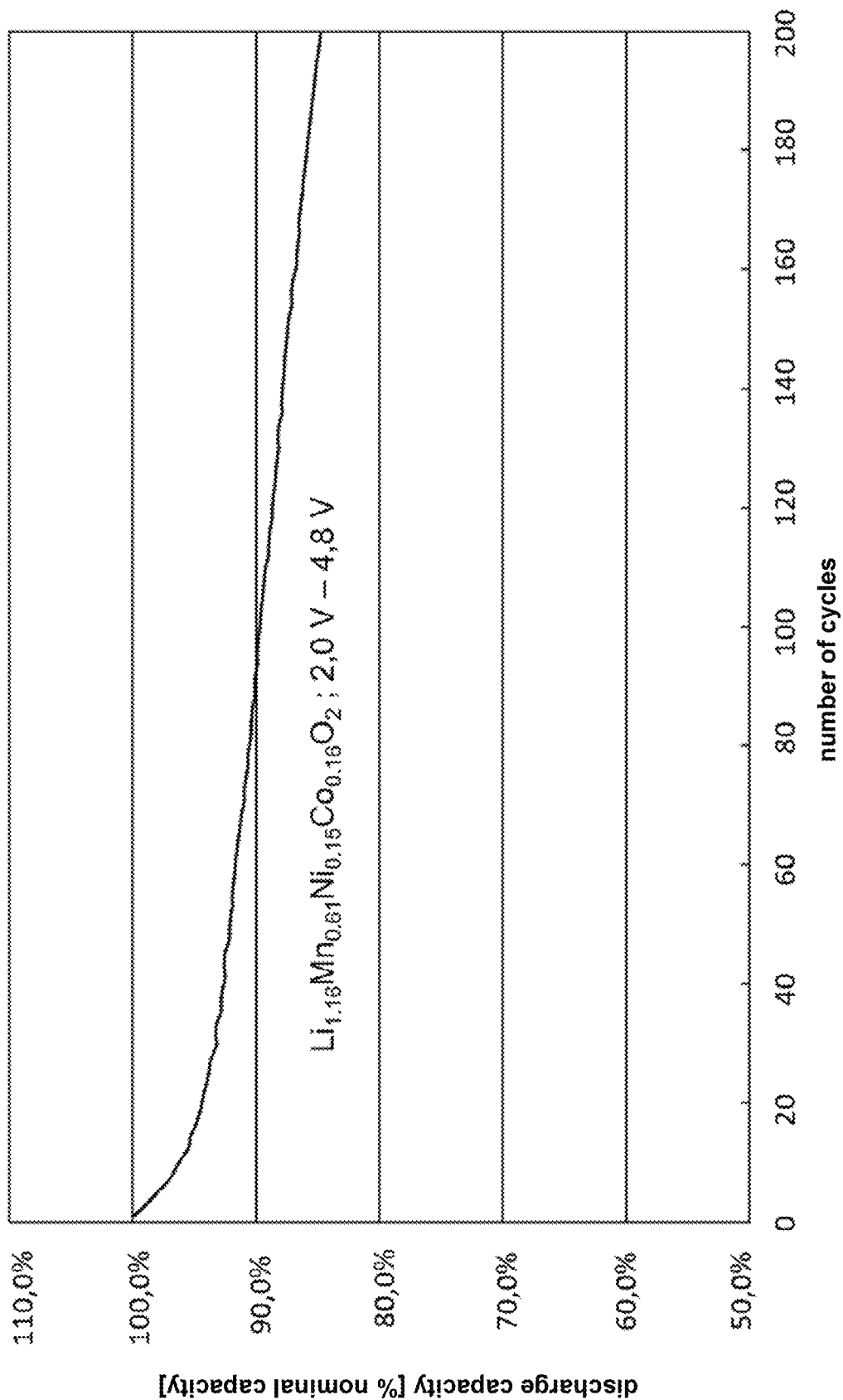
FIG. 9 shows the discharge capacity as a function of the number of cycles of a test full cell having a metal oxide of the composition $Li_{1.16}Mn_{0.61}Ni_{0.15}Co_{0.16}O_2$ as the active material of the positive electrode, wherein the end-of-charge voltage is 4.8 volts.

FIG. 9 shows mean values for the discharge capacities of the test full cell as a function of the number of cycles. These mean values of the discharge capacities are respectively expressed as a percentage of the nominal capacity [% nominal capacity]. The test full cell shows very stable behavior of the discharge capacity. A capacity of 90% is still obtained at cycle 100.

Figure 10:
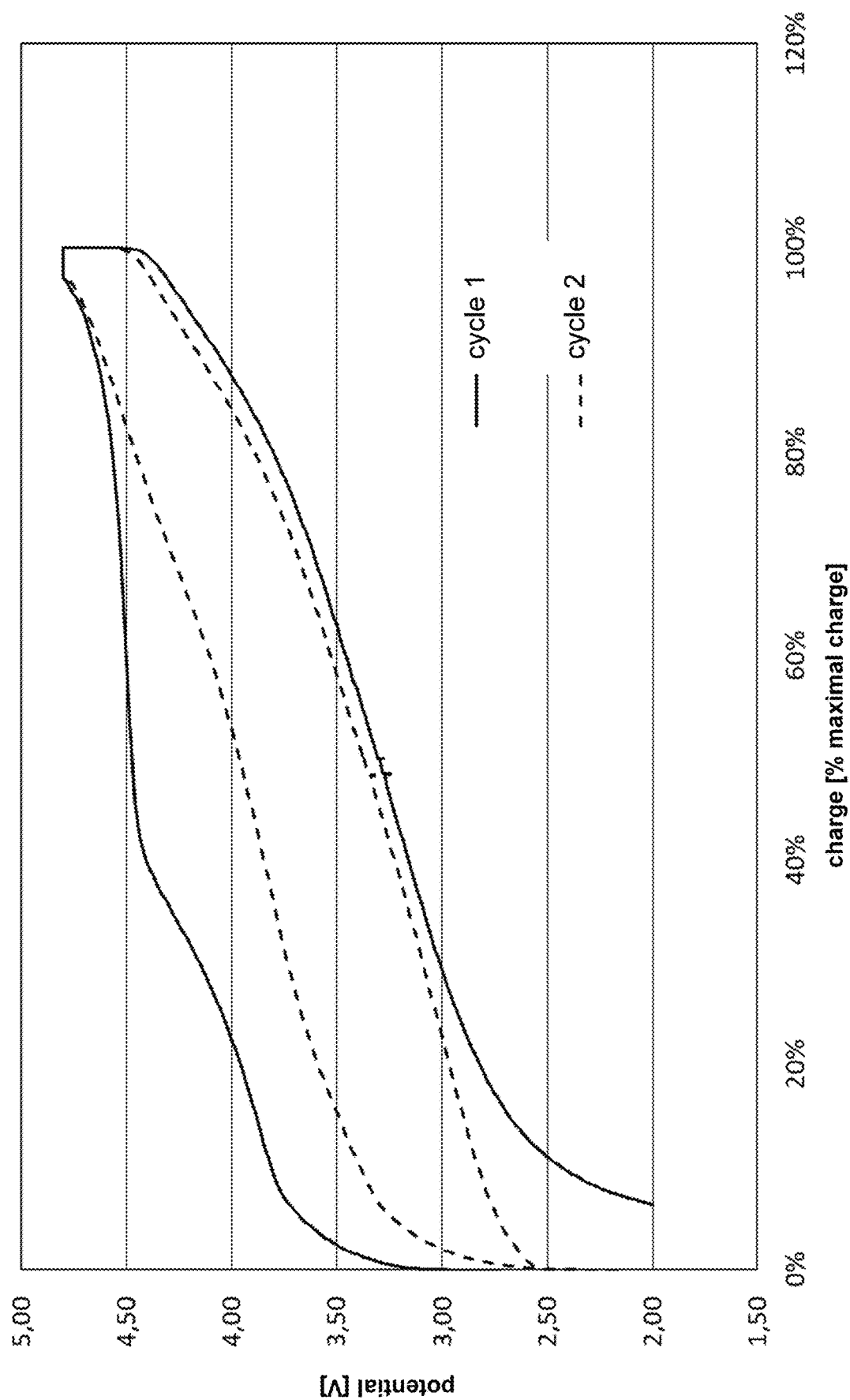
FIG. 10 shows the potential profile in volts [V] as a function of the percentage charge of cycle 1 and cycle 2 of a test full cell having a metal oxide of the composition $Li_{1.16}Mn_{0.61}Ni_{0.15}Co_{0.16}O_2$ as the active material of the positive electrode.

FIG. 10 shows the potential profile in volts [V] of cycle 1 and cycle 2 of a test full cell having a metal oxide which is rich in lithium and manganese. The metal oxide is activated in the first cycle, which enables the high specific capacities typical of this material.

The potential profile is depicted as a function of the percentage charge that is related to the maximum charge of the test full cell. The test full cell was charged at a current of 100 mA up to an upper potential of 4.8 V. The potential was held until the charge current had dropped to 40 mA. The discharge then took place with a current intensity of 100 mA up to a discharge potential of 2.0 volts.

The potential curve in cycle 1 shows a clearly different behavior than the potential curve in cycle 2. This is based on the structural change in the material known in the literature. Irreversible changes to the material take place during this process, so that active lithium ions are lost during activation in the first cycle. Only less than 90% of the lithium ions can be stored back in the lattice.

FIG. 10 shows that, in the second cycle, there is a re-storage of more than 90% and thus the irreversible losses are significantly lower than described in the literature.

In cycle 2, the high potential stability of the electrolyte is particularly evident insofar as an almost complete intercalation of the lithium ions takes place in cycle 2 at an upper end-of-charge voltage of 4.8 V.

Experiment 5: Test Full Cells Having Lithium Nickel Manganese Cobalt Oxide (NMC) of the Composition $LiNi_{0.6}Mn_{0.2}Co_{0.2}O_2$ (NMC622) as the Active Electrode Material in Combination with Electrolyte 1, Electrolyte 3 and Electrolyte 4

Various experiments were performed to investigate electrolytes 1, 3 and 4 in combination with lithium nickel manganese cobalt oxide (NMC622) as the active material of the positive electrode. On the one hand, the coating layer capacities of electrolytes 1, 3 and 4 were determined and, on the other hand, discharge capacities in all three electrolytes were determined.

Three test full cells were filled with electrolytes 1, 3 and 4 described in Example 2 to determine the coating layer capacity. The three test full cells comprised lithium nickel manganese cobalt oxide (NMC622) as the active material of the positive electrode.

Figure 11:
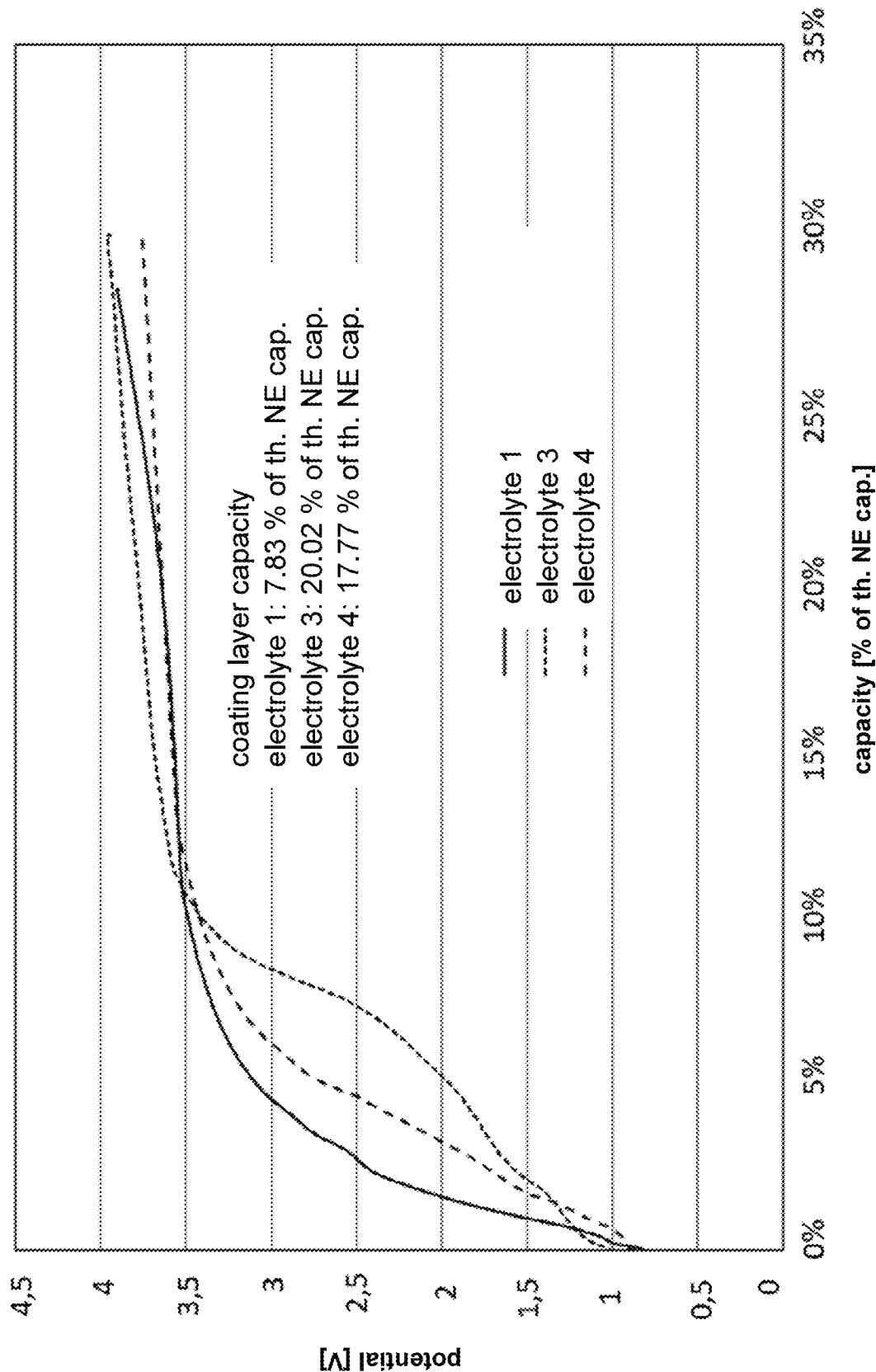
FIG. 11 shows the potential in [V] of three test full cells which were filled with electrolytes 1, 3 and 4 from Example 2 when charging a negative electrode as a function of the capacity, which is related to the theoretical capacity of the negative electrode, during formation of a coating layer on the negative electrode.

FIG. 11 shows the potential in volts of the test full cells when charging the negative electrode as a function of capacity, which is related to the theoretical capacity of the negative electrode. The two curves depicted show averaged results of several experiments with the test whole cells described above. First, the test full cells were charged with a current of 15 mA until a capacity of 125 mAh ($Q_{lad}$) was reached. The test full cells were then discharged at 15 mA until a potential of 2.5 volts was reached. The discharge capacity ($Q_{ent}$) was determined.

The capacity in % of the theory that was used to form the coating layer on the negative electrode is calculated according to the following formula:

$$\text{Coating layer capacity} = (Q_{lad}(125\text{ mAh}) - Q_{ent}(x\text{ mAh}))/Q_{NEL}$$

$Q_{NEL}$ is the theoretical capacity of the negative electrode used. The theoretical capacity is calculated, in the case of graphite, to a value of 372 mAh/g.

The coating layer capacities determined [in % of the theoretical capacity of the negative electrode] are 7.83% in electrolyte 1, 17.77% in electrolyte 4 and 20.02% in electrolyte 3. Even with the somewhat higher values of the coating layer capacity in electrolytes 3 and 4, a battery cell can be operated very well using these electrolytes in combination with the possibility of using high-voltage cathodes up to 5 volts.

For the discharge experiments, three test full cells according to Example 3 were filled with electrolytes 1, 3 and 4 described in Example 2. The test full cells had lithium nickel manganese cobalt oxide (NMC) as the active material of the positive electrode. To determine the discharge capacities (see Example 4), the test full cells were charged with a current intensity of 15 mA up to a capacity of 125 mAh. The discharge then took place with a current intensity of 15 mA up to a discharge potential of 2.5 volts.

Figure 12:
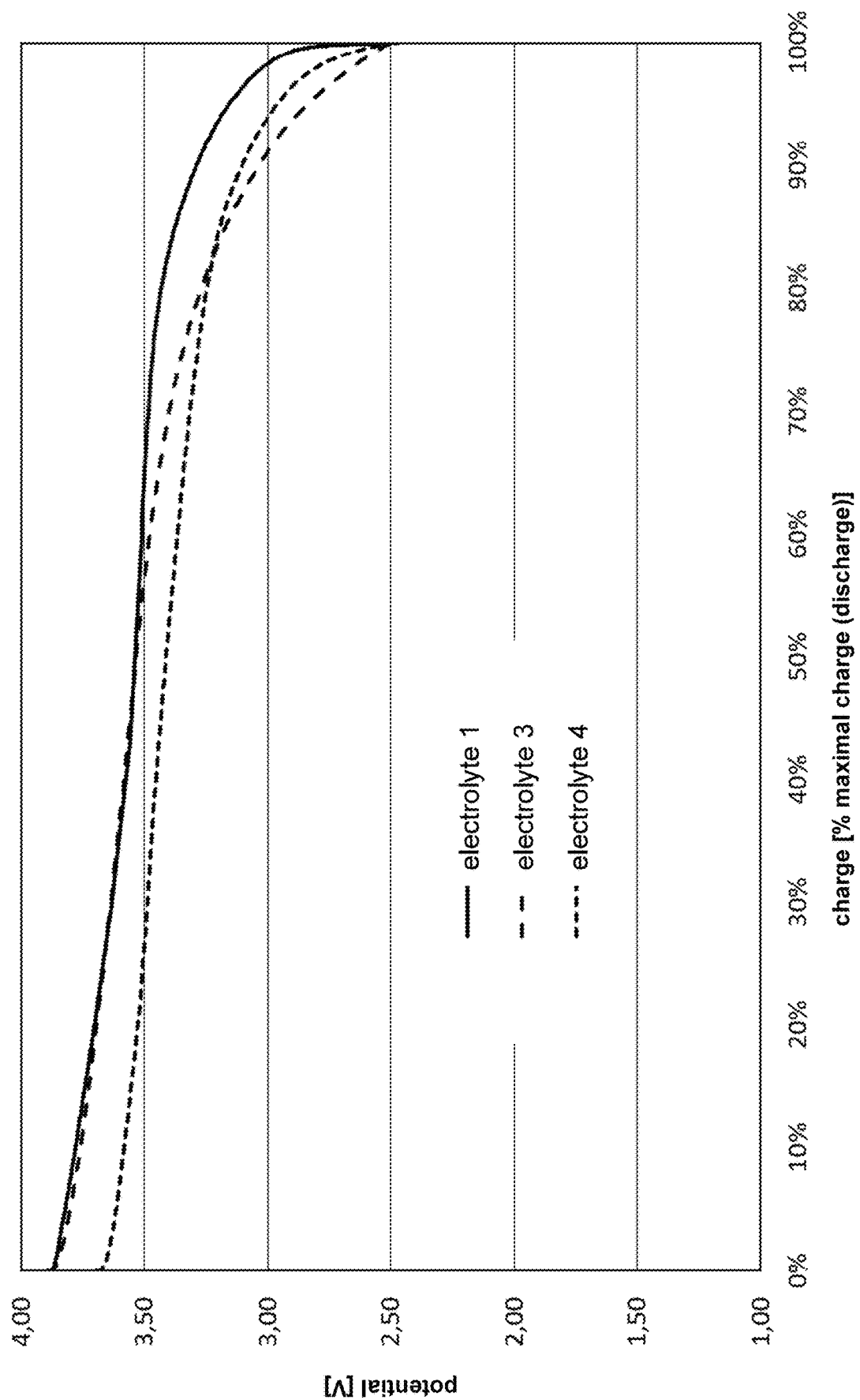
FIG. 12 shows the potential profile during discharge in volts as a function of the percentage charge of three test full cells which were filled with electrolytes 1, 3 and 4 from Example 2 and comprised lithium nickel manganese cobalt oxide (NMC) as the active electrode material.

FIG. 12 shows the potential profile during the discharge over the discharged amount of charge in % [% of the maximum charge (discharge)]. All test full cells show a flat discharge curve, which is necessary for good operation of a battery cell.

Experiment 6: Determination of the Conductivities of Electrolytes 1, 3 and 4

To determine the conductivity, electrolytes 1, 3 and 4 were prepared using different concentrations of compounds 1, 3 and 4. The conductivities of the electrolytes were determined using a conductive measurement method for each concentration of the various compounds. After temperature control, a two-electrode sensor was held touching in the solution and measured in a measuring range of 0-50 mS/cm. During the measurements, it was noted that the sensor can react with the $SO_2$-containing electrolyte solution.

Figure 13:
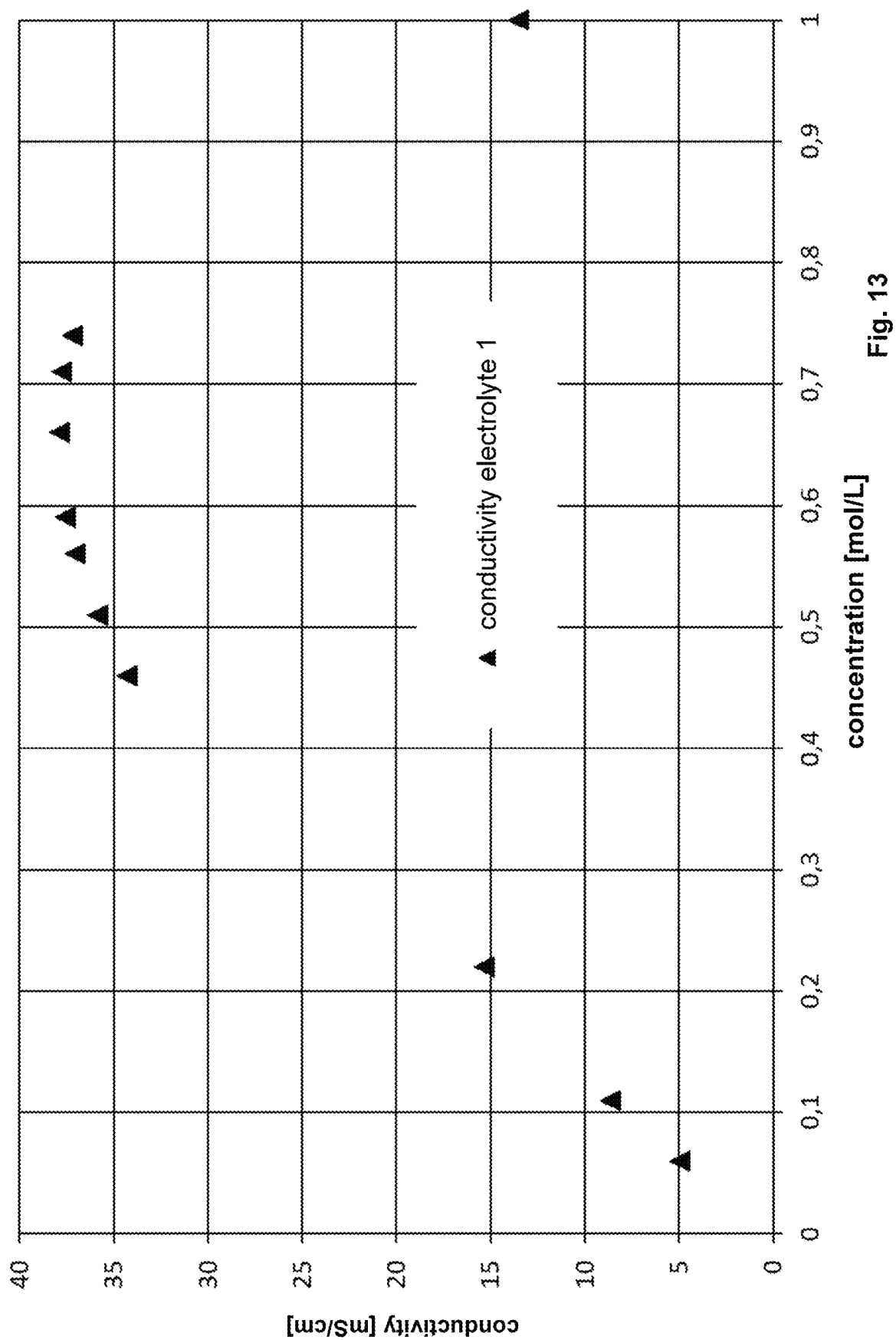
FIG. 13 shows the conductivity in [mS/cm] of electrolyte 1 from Example 2 as a function of the concentration of compound 1.

FIG. 13 shows the conductivity of electrolyte 1 as a function of the concentration of compound 1. A maximum of the conductivity can be seen at a concentration of compound 1 of 0.6 mol/L-0.7 mol/L having a value of approx. 37.9 mS/cm. In comparison, the organic electrolytes known from the prior art, such as LP30 (1 M $LiPF_6$/EC-DMC (1:1 weight)) have a conductivity of only approx. 10 mS/cm.

Figure 14:
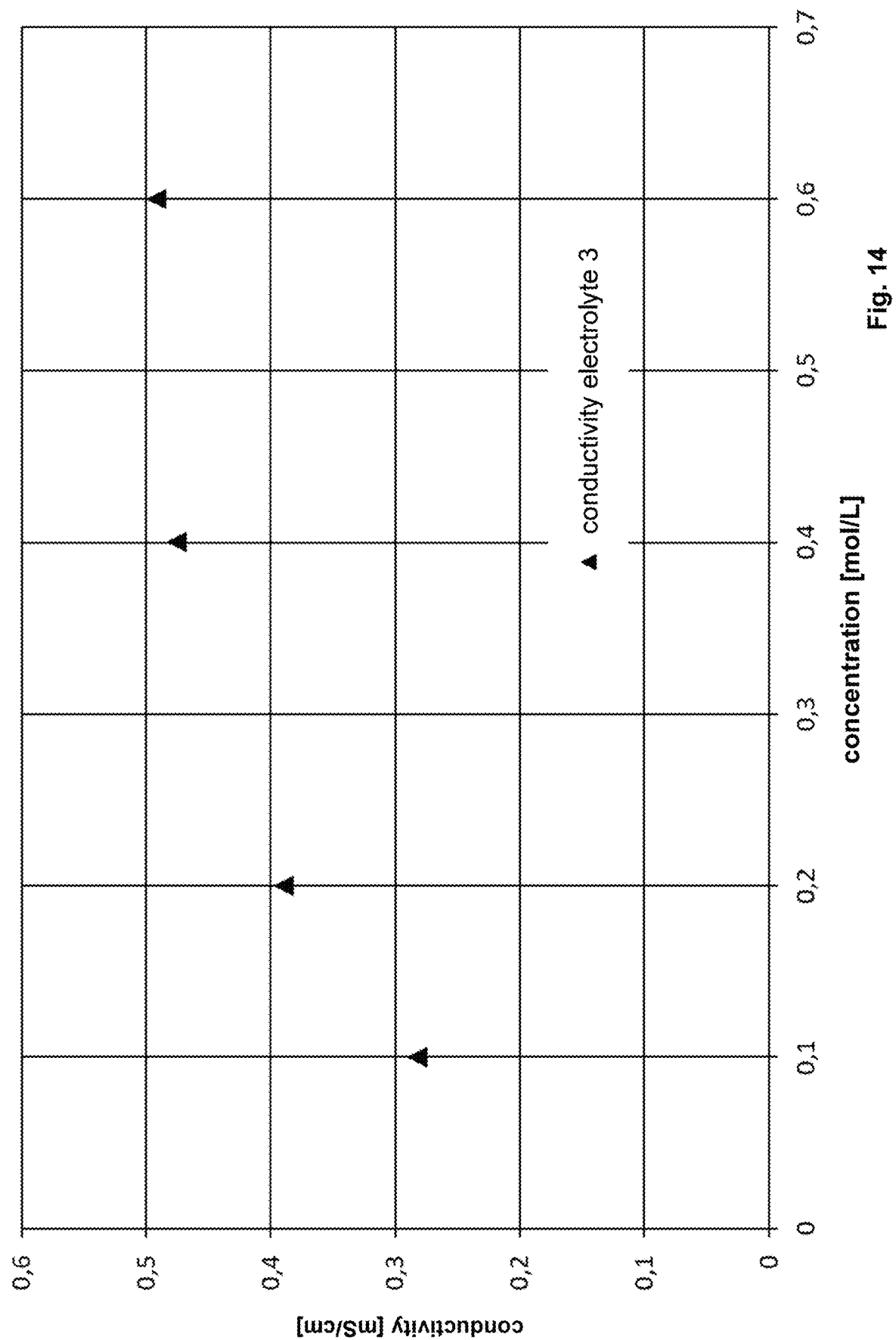
FIG. 14 shows the conductivity in [mS/cm] of electrolyte 3 from Example 2 as a function of the concentration of compound 3.
Figure 15:
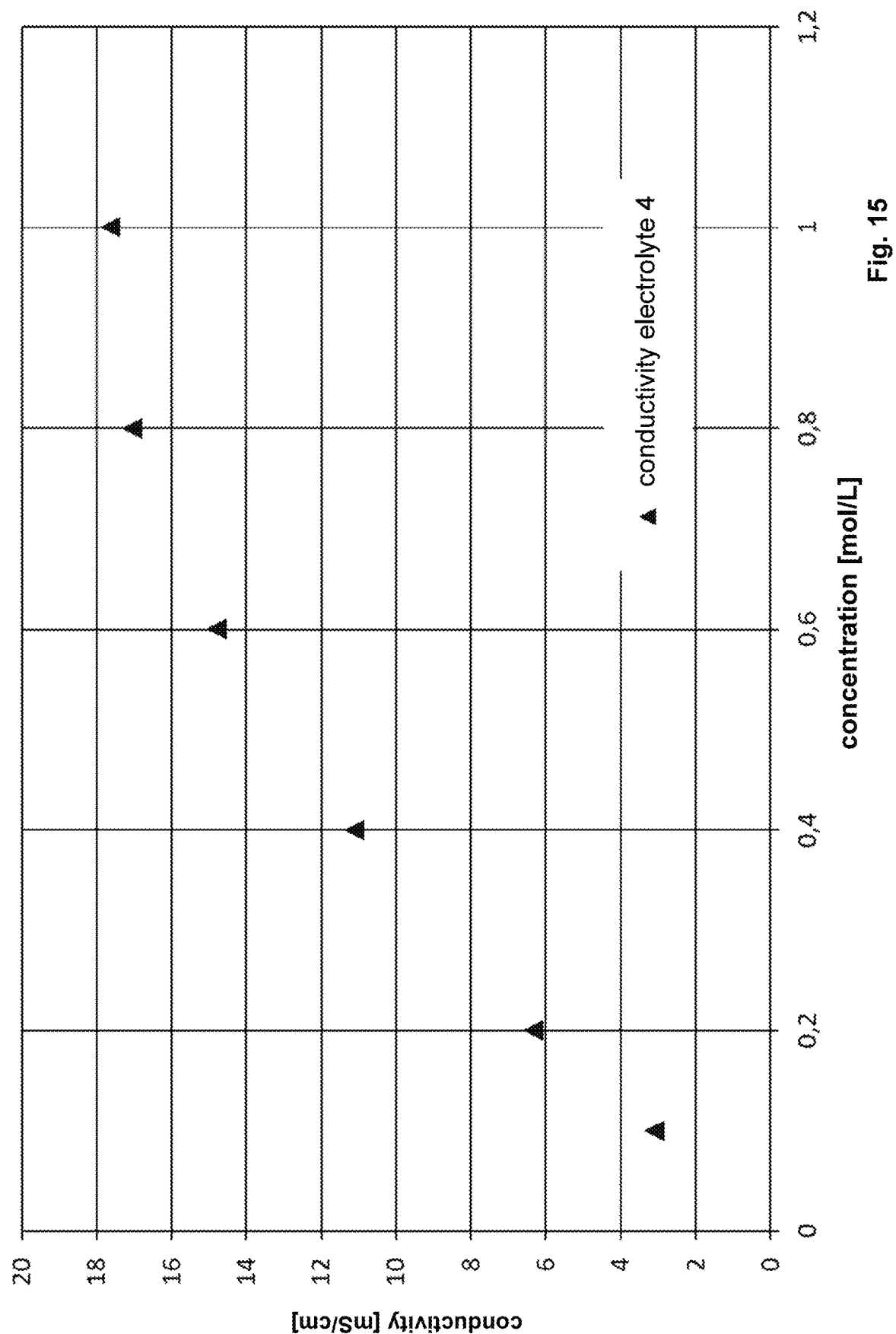
FIG. 15 shows the conductivity in [mS/cm] of electrolyte 4 from Example 2 as a function of the concentration of compound 4.

FIGS. 14 (electrolyte 3) and 15 (electrolyte 4) show the conductivity values determined for the different concentrations. With electrolyte 4, a maximum of 18 mS/cm is achieved at a conducting salt concentration of 1 mol/L. Electrolyte 3 shows its highest conductivity of 0.5 mS/cm at a conducting salt concentration of 0.6 mol/L. Although electrolyte 3 shows a lower conductivity, as in experiment 4, charging or discharging of a test full cell is quite possible.

Experiment 7: Low Temperature Behavior

Two test full cells according to example 3 were produced in order to determine the low-temperature behavior of electrolyte 1 in comparison to the reference electrolyte. One test full cell was filled with reference electrolyte of the composition $LiAlCl_4*6SO_2$ and the other test full cell with electrolyte 1. The test full cell having the reference electrolyte comprised lithium iron phosphate (LEP) as the active material, the test full cell having electrolyte 1 comprised lithium nickel manganese cobalt oxide (NMC) as the active material of the positive electrode. The test full cells were charged to 3.6 volts (LEP) or 4.4 volts (NMC) at 20° C. and discharged again to 2.5 volts at the respective temperature to be investigated. The discharge capacity reached at 20° C. was rated as 100%. The temperature for the discharge was lowered in temperature steps of 10° K. The discharge capacity obtained was described in % of the discharge capacity at 20° C. Since the low-temperature discharges are almost independent of the active materials used for the positive and negative electrodes, the results can be transferred to all combinations of active materials. Table 5 shows the results.

TABLE 5

Discharge Capacities as a Function of the Temperature

| Temperature | Discharge Capacity of Electrolyte 1 | Discharge Capacity of Reference Electrolyte |
|---|---|---|
| 20° C. | 100% | 100% |
| 10° C. | 99% | 99% |
| 0° C. | 95% | 46% |
| −10° C. | 89% | 21% |
| −20° C. | 82% | n/a |
| −30° C. | 73% | n/a |
| −35° C. | 68% | n/a |
| −40° C. | 61% | n/a |

The test full cell having electrolyte 1 shows very good low-temperature behavior. At −20° C., 82% of the capacity is reached, at −30° C., 73%. Even at a temperature of −40° C., 61% of the capacity can still be discharged. In contrast, the test full cell having the reference electrolyte only shows a discharge capacity down to −10° C. A capacity of 21% is achieved here. The cell having the reference electrolyte can no longer be discharged at lower temperatures.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A rechargeable battery cell, comprising:
at least one positive electrode comprising a compound in the form of a layered oxide as an active material, wherein the layered oxide comprises a face-centered cubic lattice having oxygen atoms at the lattice positions and metal ions in the octahedral holes;
at least one negative electrode;
a housing;
an $SO_2$ based electrolyte having at least one first conducting salt which has the formula (I):

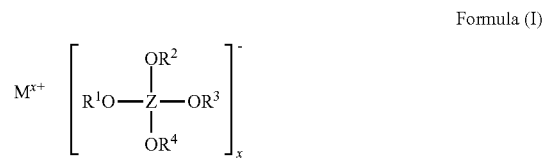

Formula (I)

wherein:
M is a metal selected from the group consisting of alkali metals, alkaline earth metals, metals of group 12 of the periodic table of the elements, and aluminum;
x is an integer from 1 to 3;
$R^1$, $R^2$, $R^3$ and $R^4$ are selected independently of one another from the group consisting of substituted or unsubstituted $C_1$-$C_{10}$ alkyl, $C_2$-$C_{10}$ alkenyl, $C_2$-$C_{10}$ alkynyl, $C_3$-$C_{10}$ cycloalkyl, $C_6$-$C_{14}$ aryl and $C_5$-$C_{14}$ heteroaryl; and Z is aluminum or boron.

2. The rechargeable battery cell according to claim 1, wherein the compound has the composition $A_xM'_yM''_zO_2$, wherein:

A is at least one metal selected from the group consisting of the alkali metals, the alkaline earth metals, the metals of group 12 of the periodic table and aluminum;

M' is at least one metal selected from the group consisting of the elements Ti, V, Cr, Mn, Fe, Co, Ni, Cu and Zn;

M'' is at least one element selected from the group consisting of the elements of groups 2, 3, 4, 5, 6, 7, 8, 9, 10, 11, 12, 13, 14, 15 and 16 of the periodic table of the elements;

x and y independently of one another are numbers greater than 0 and less than or equal to 2;

z is a number greater than or equal to 0 and less than or equal to 1; and the numbers or indices x, y, z of the metal ions A, M' and M'' are chosen such that there is charge neutrality within the composition.

3. The rechargeable battery cell according to claim 2, wherein the compound has the composition $A_xM'_yM''_zO_2$, in which A is lithium and M' is cobalt.

4. The rechargeable battery cell according to claim 3, wherein x and y are equal to 1, and z is equal to 0.

5. The rechargeable battery cell according to claim 2, wherein the compound has the composition $A_xM'_yM''_zO_2$, in which A is lithium, M' comprises nickel and manganese and M'' is cobalt.

6. The rechargeable battery cell according to claim 5, wherein the compound has the composition $Li_xNi_{y1}Mn_{y2}Co_zO_2$, wherein x, y1 and y2 are, independently of one another, numbers greater than 0.

7. The rechargeable battery cell according to claim 6, wherein the compound has the composition $LiNi_{0.33}Mn_{0.33}Co_{0.33}O_2$, $LiNi_{0.5}Mn_{0.3}Co_{0.2}O_2$, $LiNi_{0.5}Mn_{0.25}Co_{0.25}O_2$, $LiNi_{0.52}Mn_{0.32}Co_{0.16}O_2$, $LiNi_{0.55}Mn_{0.30}Co_{0.15}O_2$, $LiNi_{0.58}Mn_{0.14}Co_{0.28}O_2$, $LiNi_{0.6}Mn_{0.2}Co_{0.2}O_2$, $LiNi_{0.64}Mn_{0.18}Co_{0.18}O_2$, $LiNi_{0.65}Mn_{0.27}Co_{0.08}O_2$, $LiNi_{0.7}Mn_{0.2}Co_{0.1}O_2$, $LiNi_{0.7}Mn_{0.15}Co_{0.15}O_2$, $LiNi_{0.72}Mn_{0.10}Co_{0.18}O_2$, $LiNi_{0.76}Mn_{0.14}Co_{0.10}O$, $LiNi_{0.8}Mn_{0.1}Co_{0.1}O_2$, $LiNi_{0.86}Mn_{0.04}Co_{0.10}O_2$, $LiNi_{0.90}Mn_{0.05}Co_{0.05}O_2$, $LiNi_{0.95}Mn_{0.025}Co_{0.025}O_2$ or a combination thereof.

8. The rechargeable battery cell according to claim 2, wherein the compound has the composition $Li_xMn_yM''_zO_2$, wherein x is a number greater than or equal to 1 and y is a number greater than the number z.

9. The rechargeable battery cell according to claim 8, wherein the compound has the composition $Li_xMn_yM''_zO_2$, in which M'' is nickel and/or cobalt.

10. The rechargeable battery cell according to claim 9, wherein the compound has the composition $Li_{1.2}Mn_{0.525}Ni_{0.175}Co_{0.1}O_2$, $Li_{1.2}Mn_{0.6}Ni_{0.2}O_2$, $Li_{1.16}Mn_{0.61}Ni_{0.15}Co_{0.16}O_2$ or $Li_{1.2}Mn_{0.54}Ni_{0.13}Co_{0.13}O$.

11. The rechargeable battery cell according to claim 1, wherein $R^1$, $R^2$, $R^3$ and $R^4$ of the first conducting salt are selected independently of one another from the group consisting of:

$C_1$-$C_6$ alkyl;
$C_2$-$C_6$ alkenyl;
$C_2$-$C_6$ alkynyl;

$C_3$-$C_6$ cycloalkyl;
phenyl; and
$C_5$-$C_7$ heteroaryl.

12. The rechargeable battery cell according to claim 1, wherein at least one of $R^1$, $R^2$, $R^3$ and $R^4$ of the first conducting salt is substituted by at least one fluorine atom and/or by at least one chemical group, wherein the chemical group is selected from the group consisting of $C_1$-$C_4$ alkyl, $C_2$-$C_4$ alkenyl, $C_2$-$C_4$ alkynyl, phenyl and benzyl.

13. The rechargeable battery cell according to claim 1, wherein at least one of $R^1$, $R^2$, $R^3$ and $R^4$ of the first conducting salt is a $CF_3$ group or an $OSO_2CF_3$ group.

14. The rechargeable battery cell according to claim 1, wherein the first conducting salt is selected from the group consisting of:

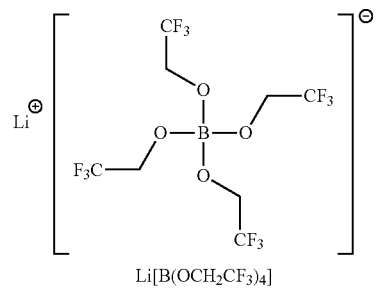

Li[B(OCH$_2$CF$_3$)$_4$]

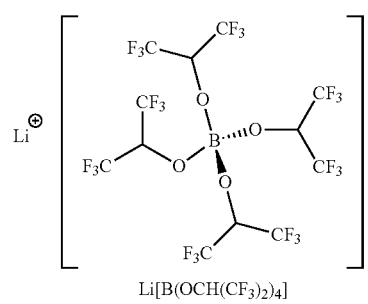

Li[B(OCH(CF$_3$)$_2$)$_4$]

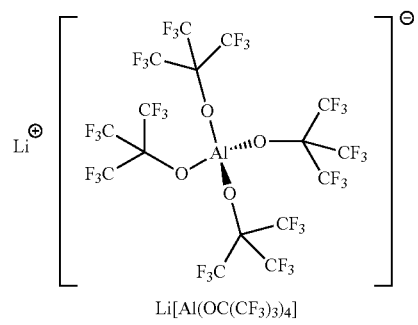

Li[Al(OC(CF$_3$)$_3$)$_4$]

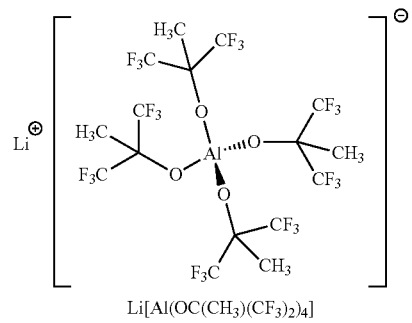

Li[Al(OC(CH$_3$)(CF$_3$)$_2$)$_4$]

-continued

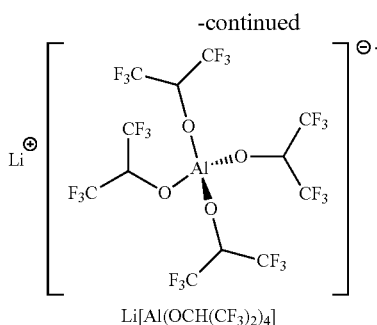

Li[Al(OCH(CF$_3$)$_2$)$_4$]

15. The rechargeable battery cell according to claim 1, wherein the electrolyte comprises a second conducting salt different from the first conducting salt according to formula (I).

16. The rechargeable battery cell according to claim 15, wherein the second conducting salt is an alkali metal compound.

17. The rechargeable battery cell according to claim 16, wherein the second conducting salt comprises a lithium compound selected from the group consisting of an aluminate, a halide, an oxalate, a borate, a phosphate, an arsenate and a gallate.

18. The rechargeable battery cell according to claim 15, wherein the second conducting salt is a lithium tetrahaloaluminate.

19. The rechargeable battery cell according to claim 18, wherein the second conducting salt is lithium tetrachloroaluminate.

20. The rechargeable battery cell according to claim 1, wherein the electrolyte comprises at least one additive.

21. The rechargeable battery cell according to claim 20, wherein the additive of the electrolyte is selected from the group consisting of vinylene carbonate and its derivatives, vinylethylene carbonate and its derivatives, methylethylene carbonate and its derivatives, lithium (bisoxalato)borate, lithium difluoro(oxalato)borate, lithium tetrafluoro(oxalato) phosphate, lithium oxalate, 2-vinylpyridine, 4-vinylpyridine, cyclic exomethylene carbonates, sultones, cyclic and acyclic sulfonates, acyclic sulfites, cyclic and acyclic sulfinates, organic esters, inorganic acids, acyclic and cyclic alkanes, which acyclic and cyclic alkanes have a boiling point of at least 36° C. at 1 bar, aromatic compounds, halogenated cyclic and acyclic sulfonylimides, halogenated cyclic and acyclic phosphate esters, halogenated cyclic and acyclic phosphines, halogenated cyclic and acyclic phosphites, halogenated cyclic and acyclic phosphazenes, halogenated cyclic and acyclic silylamines, halogenated cyclic and acyclic halogenated esters, halogenated cyclic and acyclic amides, halogenated cyclic and acyclic anhydrides, and halogenated organic heterocycles.

22. The rechargeable battery cell according to claim 1, wherein the electrolyte comprises:
(i) 5 to 99.4% by weight sulfur dioxide,
(ii) 0.6 to 95% by weight of the first conducting salt,
(iii) 0 to 25% by weight of the second conducting salt, and
(iv) 0 to 10% by weight of the additive,
based on the total weight of the electrolyte composition.

23. The rechargeable battery cell according to claim 1, wherein the molar concentration of the first conducting salt is in a range based on the total volume of the electrolyte of from 0.01 mol/L to 10 mol/L.

24. The rechargeable battery cell according to claim 1, wherein the electrolyte comprises $SO_2$ in an amount of between 0.1 mol $SO_2$ and 2600 mol $SO_2$ per mole of conducting salt.

25. The rechargeable battery cell according to claim 1, wherein the negative electrode stores ions of an active metal, and wherein the active metal is selected from the group consisting of an alkali metal, an alkaline earth metal, a metal from group 12 of the periodic table and aluminum.

26. The rechargeable battery cell according to claim 25, wherein the alkali metal is lithium or sodium, the alkaline earth metal is calcium, and the metal selected from group 12 of the periodic table is zinc.

27. The rechargeable battery cell according to claim 1, wherein the negative electrode is an insertion electrode.

28. The rechargeable battery cell according to claim 27, wherein insertion electrode comprises carbon as the active material.

29. The rechargeable battery cell according to claim 28, wherein insertion electrode comprises allotrope graphite.

30. The rechargeable battery cell according to claim 1, wherein the positive electrode and/or the negative electrode have a discharge element, which is formed either planar in the form of a metal sheet or a metal foil, or three-dimensional in the form of a porous metal structure.

31. The rechargeable battery cell according to claim 30, wherein the porous metal structure comprises a metal foam.

32. The rechargeable battery cell according to claim 1, wherein the positive electrode and/or the negative electrode comprises a fluorinated binder, or
a binder consisting of a polymer which is built up from monomeric structural units of a conjugated carboxylic acid or from the alkali, alkaline earth or ammonium salt of said conjugated carboxylic acid or from a combination thereof, or
a binder consisting of a polymer based on monomeric styrene and butadiene structural units,
or a binder from the group of carboxymethyl celluloses, wherein the binder is present in a concentration of at most 20% by weight based on the total weight of the positive electrode.

33. The rechargeable battery cell according to claim 1, wherein the positive electrode and/or the negative electrode comprises a fluorinated binder, and wherein the fluorinated binder is polyvinylidene fluoride and/or a terpolymer made of tetrafluoroethylene, hexafluoropropylene and vinylidene fluoride.

34. The rechargeable battery cell according to claim 1, wherein the at least one negative electrode comprises a plurality of negative electrodes and the at least one positive electrode comprises a plurality of positive electrodes, wherein the negative and positive electrodes are stacked alternately in the housing.

35. The rechargeable battery cell according to claim 34, wherein the positive electrodes and the negative electrodes are each electrically separated from one another by separators.

36. The rechargeable battery cell according to claim 1, wherein the molar concentration of the first conducting salt is in a range based on the total volume of the electrolyte of from 0.05 mol/L to 10 mol/L.

37. The rechargeable battery cell according to claim 1, wherein the molar concentration of the first conducting salt is in a range based on the total volume of the electrolyte of from 0.1 mol/L to 6 mol/L.

38. The rechargeable battery cell according to claim 1, wherein the molar concentration of the first conducting salt is in a range based on the total volume of the electrolyte of from 0.2 mol/L to 3.5 mol/L.

39. The rechargeable battery cell according to claim 1, wherein the electrolyte comprises $SO_2$ in an amount of between 1 mol $SO_2$ and 2600 mol $SO_2$ per mole of conducting salt.

40. The rechargeable battery cell according to claim 1, wherein the electrolyte comprises $SO_2$ in an amount of between 5 mol $SO_2$ and 2600 mol $SO_2$ per mole of conducting salt.

41. The rechargeable battery cell according to claim 1, wherein the electrolyte comprises $SO_2$ in an amount of between 10 mol $SO_2$ and 2600 mol $SO_2$ per mole of conducting salt.

42. The rechargeable battery cell according to claim 1, wherein the electrolyte comprises $SO_2$ in an amount of between 20 mol $SO_2$ and 2600 mol $SO_2$ per mole of conducting salt.

43. The rechargeable battery cell according to claim 1, wherein the positive electrode and/or the negative electrode comprises a fluorinated binder, or
- a binder consisting of a polymer which is built up from monomeric structural units of a conjugated carboxylic acid or from the alkali, alkaline earth or ammonium salt of said conjugated carboxylic acid or from a combination thereof, or
- a binder consisting of a polymer based on monomeric styrene and butadiene structural units,
- or a binder from the group of carboxymethyl celluloses,
- wherein the binder is present in a concentration of at most 15% by weight based on the total weight of the positive electrode.

44. The rechargeable battery cell according to claim 1, wherein the positive electrode and/or the negative electrode comprises a fluorinated binder, or
- a binder consisting of a polymer which is built up from monomeric structural units of a conjugated carboxylic acid or from the alkali, alkaline earth or ammonium salt of said conjugated carboxylic acid or from a combination thereof, or
- a binder consisting of a polymer based on monomeric styrene and butadiene structural units,
- or a binder from the group of carboxymethyl celluloses,
- wherein the binder is present in a concentration of at most 10% by weight based on the total weight of the positive electrode.

45. The rechargeable battery cell according to claim 1, wherein the positive electrode and/or the negative electrode comprises a fluorinated binder, or a binder consisting of a polymer which is built up from monomeric structural units of a conjugated carboxylic acid or from the alkali, alkaline earth or ammonium salt of said conjugated carboxylic acid or from a combination thereof, or
- a binder consisting of a polymer based on monomeric styrene and butadiene structural units,
- or a binder from the group of carboxymethyl celluloses,
- wherein the binder is present in a concentration of at most 7% by weight based on the total weight of the positive electrode.

46. The rechargeable battery cell according to claim 1, wherein the positive electrode and/or the negative electrode comprises a fluorinated binder, or
- a binder consisting of a polymer which is built up from monomeric structural units of a conjugated carboxylic acid or from the alkali, alkaline earth or ammonium salt of said conjugated carboxylic acid or from a combination thereof, or
- a binder consisting of a polymer based on monomeric styrene and butadiene structural units,
- or a binder from the group of carboxymethyl celluloses,
- wherein the binder is present in a concentration of at most 5% by weight based on the total weight of the positive electrode.

47. The rechargeable battery cell according to claim 1, wherein the positive electrode and/or the negative electrode comprises a fluorinated binder, or
- a binder consisting of a polymer which is built up from monomeric structural units of a conjugated carboxylic acid or from the alkali, alkaline earth or ammonium salt of said conjugated carboxylic acid or from a combination thereof, or
- a binder consisting of a polymer based on monomeric styrene and butadiene structural units,
- or a binder from the group of carboxymethyl celluloses,
- wherein the binder is present in a concentration of at most 2% by weight based on the total weight of the positive electrode.

* * * * *